US009875106B2

(12) United States Patent
Godard et al.

(10) Patent No.: US 9,875,106 B2
(45) Date of Patent: Jan. 23, 2018

(54) COMPUTER PROCESSOR EMPLOYING INSTRUCTION BLOCK EXIT PREDICTION

(71) Applicant: Mill Computing, Inc., Palo Alto, CA (US)

(72) Inventors: Roger Rawson Godard, East Palo Alto, CA (US); Arthur David Kahlich, Sunnyvale, CA (US)

(73) Assignee: Mill Computing, Inc., Palo Alto, CA (US)

( * ) Notice: Subject to any disclaimer, the term of this patent is extended or adjusted under 35 U.S.C. 154(b) by 327 days.

(21) Appl. No.: 14/539,087

(22) Filed: Nov. 12, 2014

(65) Prior Publication Data

US 2016/0132331 A1 May 12, 2016

(51) Int. Cl.
*G06F 9/00* (2006.01)
*G06F 9/44* (2006.01)
*G06F 9/38* (2006.01)

(52) U.S. Cl.
CPC .......... *G06F 9/3806* (2013.01); *G06F 9/3804* (2013.01)

(58) Field of Classification Search
None
See application file for complete search history.

(56) References Cited

U.S. PATENT DOCUMENTS

| | | | | |
|---|---|---|---|---|
| 5,838,962 A * | 11/1998 | Larson | ................ | G06F 9/3844 712/239 |
| 5,870,575 A * | 2/1999 | Kahle | ................ | G06F 9/3017 703/26 |
| 6,115,809 A * | 9/2000 | Mattson, Jr. | ............ | G06F 8/445 712/239 |
| 6,279,101 B1 * | 8/2001 | Witt | ...................... | G06F 9/3836 712/206 |
| 6,550,004 B1 * | 4/2003 | Henry | ................... | G06F 9/3846 712/236 |
| 8,171,260 B2 * | 5/2012 | Gelman | ............... | G06F 9/3844 712/206 |
| 2014/0229719 A1 * | 8/2014 | Smeets | ................. | G06F 9/3848 712/239 |

(Continued)

OTHER PUBLICATIONS

Effective Ahead Pipelining of Instruction Block Address Generation, Andre Seznec and Antony Fraboulet, ACM-IEEE International Symposium on Computer Architecture, Jun. 2003.

(Continued)

*Primary Examiner* — Michael Sun
(74) *Attorney, Agent, or Firm* — Gordon & Jacobson, P.C.

(57) ABSTRACT

A computer processor is provided that executes sequences of instructions stored in memory. The sequences of instructions are organized as one or more instruction blocks each having an entry point and at least one exit point offset from the entry point. An apparatus for predicting control flow through sequences of instructions includes a table storing a plurality of entries each associated with an instruction block or part thereof. At least one entry of the table corresponding to a given instruction block or part thereof includes a predictor corresponding to a predicted execution path that exits the given Instruction block or part thereof. The table is queried in order to generate a chain of predictors corresponding to a sequence of instruction blocks or parts thereof that is predicted to be executed by the computer processor.

27 Claims, 10 Drawing Sheets

(56) References Cited

U.S. PATENT DOCUMENTS

2014/0281430 A1* 9/2014 Gschwind ........... G06F 9/30007
  712/226
2016/0092230 A1* 3/2016 Chen ....................... G06F 9/381
  712/241

OTHER PUBLICATIONS

Effective Compiler Support for Predicated Execution Using the Hyperblock, Scott A. Mahlke et al., 0-8186-3175-09/92, 1992 IEEE.
Phantom-BTP: A Virtualized Branch Target Buffer Design, Ioana Burcea et al., ASPLOS '09, 2009.

* cited by examiner

Fetch ⟶ Decode ⟶ Issue ⟶ Execute ⟶ Retire

COMPUTER PROCESSOR EMPLOYING INSTRUCTION BLOCK EXIT PREDICTION

BACKGROUND

1. Field

The present disclosure relates to computer processors.

2. Related Art

Modern computer processors (also known as central processing units or CPUs) employ branch prediction and a pipelined instruction fetch process so as to be able to feed a new decoded instruction (or several, depending on the architecture) into issue every cycle. The instruction fetch pipeline can be lengthy. The penalty for misprediction of a branch operation can take many cycles as the instruction fetch pipeline needs to be flushed and filled with instructions starting from the point of the mispredicted branch operation. This penalty would be prohibitive if it was imposed on every conditional branch operation, hence the need for efficient branch prediction.

It is relatively easy to know the next instruction in advance of execution when instructions are issued in consecutive sequence. In architectures with fixed-length instructions, the location of the Nth next instruction is N instruction widths ahead of the location of the current instruction. The relation is not so direct with variable-length instructions. In practice, instruction fetch pipelines have little trouble with consecutive instructions.

Unfortunately, actual program instructions are not always consecutive. Except for certain highly specialized kinds of programs, most programs are replete with branch operations (or subroutine call operations and corresponding return operations) that transfers control away from the linear sequence of instructions that can be efficiently pipelined. After some fetching of instructions from one run of consecutive addresses, the transfer starts fetching from a different run of addresses. However, to do so without a hiccup, the instruction fetch pipeline must know where the new run will be and at which cycle in the future it starts.

That time-and-place information is in the encoding of the operations that redirect control flow and the data operands that they have as arguments. However, the ordinary flow of execution will not examine these transfer operations until they issue, and by then it is too late (by the amount of the pipeline delay) to redirect the instruction fetch pipeline to the new run. Hence, each operation that actually transfers adds a whole pipeline delay to execution.

There are several established ways to avoid this problem, but the most important is branch prediction. This approach builds on the execution behavior for a given conditional branch operation. There are innumerable branch prediction schemes, many of them subtle and complex. However, they all seek to predict what instruction will execute next after a conditional branch operation. All branch prediction schemes are vulnerable to making incorrect predictions. If the prediction is wrong (a mispredict), then the instruction fetch pipeline is full of instructions from the incorrect execution path. In this case, such instructions are discarded and the instructions from the correct execution path are fetched and decoded after a full pipeline delay. If, for example, the branch prediction scheme is correct 90% of the time and conditional branch operations are 20% of the total (a common figure for general code), then there will be one mispredict on average every 50 instructions. If, for example, the pipeline delay is 30 cycles, then nearly 40% of the CPU cycles are wasted recovering from mispredictions.

The various branch prediction strategies commonly used by or proposed for CPUs employ hardware-based tables that retain the history of the CPU's prior experience with branch operations. Exactly what this history information comprises, and how it is used to decide on a prediction, varies by strategy. A conventional predictor keeps a table entry for each branch operation that it may execute. Commonly the information is organized as a hardware-based hash table indexed by the memory address of the branch instruction. The instruction pipeline, on recognizing a branch operation, hashes the address of the branch operation to generate a table index and then looks for a table entry that predicts whether the branch operation will be taken or not. For dynamic branch operations (ones where the target is computed at run time) the tables may also contain the target address of the branch operation, or at least what its target was the last time it was executed.

All of the branch prediction strategies benefit from keeping more information, either to have more history about a particular branch instruction, or to be able to keep history about more branch instructions. Unfortunately, increasing the size of the hardware-based hash table costs in die area and execution delays.

Branch prediction schemes also typically predict flow control operations via conditional call and return operations. Programs are commonly divided into separate units of program code referred to as subroutines or functions or procedures. The unit of program code can be activated and executed to perform its behavior by a programmatic device known as a call operation. The call operation identifies the unit of program code that is to be activated, and then pauses the currently running unit of program code until the execution of the called unit of program code is complete by the execution of a return operation that returns the control flow of the program to the point of call operation. Then the portion of the program code that made the call operation resumes its execution at the point of the call operation. The execution of the called unit of program code can include call operations (nested calls). A unit of code that does not call any other unit of code is said to be a leaf function. The unit of code that is the beginning of the whole program, implicitly called by the operating system, is the root function or main. Branch operations, call operations and return operations can be unconditional in nature where the transfer of control is not dependent on any conditions. Thus the transfer by the operation always happens. Branch operations, call operations and return operations can be conditional in nature where the transfer of control is dependent on a condition (predicate). If the condition is evaluated to be true, then the transfer by the operation happens. If the condition is evaluated to be false, then the transfer by the operation does not happen.

SUMMARY

A computer processor is provided that executes sequences of instructions stored in memory. The sequences of instructions are organized as one or more instruction blocks each having an entry point and at least one exit point (possibly multiple exit points) offset from the entry point. An apparatus for predicting control flow through sequences of instructions includes a table storing a plurality of entries each associated with an instruction block or part thereof. At least one entry of the table corresponding to a given instruction block or part thereof includes a predictor corresponding to a predicted execution path that exits the given instruction block or part thereof. The table is queried in order to generate a chain of predictors corresponding to a sequence of instruction blocks or parts thereof that is predicted to be executed by the computer processor.

The at least one entry corresponding to the given instruction block or part thereof can include an address field that points to a target instruction block or part thereof. The address field can represent an offset address relative to a base address.

The at least one entry corresponding to the given instruction block or part thereof can further include information that represents the extent of the instructions of the given instruction block or part thereof that are predicted to be executed as stored in memory, such as a cache line count value and an instruction count value. The cache line count value can represent the number of cache lines of the given instruction block or part thereof as stored in memory, and the instruction count value can represent the number of instructions in the last cache line of the given instruction block or part thereof as stored in memory.

The at least one entry corresponding to the given instruction block or part thereof can further include information that is used to control prefetching of cache lines of the given instruction block or part thereof into cache that is logically part of the memory that stores the sequence of instructions, or hoist such cache lines within the cache.

The at least one entry corresponding to the given instruction block or part thereof can further include information that is used to control fetching of cache lines of the given instruction block or part thereof into an instruction buffer.

The at least one entry corresponding to the given instruction block or part thereof can further include information that is used to control decoding of the instructions of the given instruction block or part thereof. For example, such information can be used to obtain cache lines of the given instruction block or part thereof from an instruction buffer for decode processing and/or to control isolation of instructions from the cache lines of the given instruction block or part thereof for instruction decode processing.

The at least one entry corresponding to the given instruction block or part thereof can further include metadata corresponding to the predictor, wherein the metadata is selected from the group consisting of:

an indicator of the expected kind of control transfer operation to the target instruction block or part thereof,
a count of the number of untaken conditional call operations contained by the corresponding instruction block or part thereof,
a number of key check bits for detecting hashing collisions,
information about the quality of the prediction defined by the predictor, and
loop information for the corresponding instruction block or part thereof.

In one embodiment, the apparatus further includes an exit cache that stores predictors output from the table. Furthermore, a prefetcher can be configured to process predictors output from the table in order to prefetch cache lines of instruction blocks or parts thereof that correspond to the predictors output from the table, where the prefetched cache lines are staged into cache that is logically part of the memory that stores the sequence of instructions, or hoisted within the cache. A queue can be configured to store a set of predictors output from the exit cache. A fetcher can be configured to process the set of predictors stored in the queue in order to fetch cache lines of instruction blocks or parts thereof that correspond to the processed predictors into an instruction buffer. Decode control logic can be configured to process the set of predictors stored in the queue in order to control decoding of instructions of instruction blocks or parts thereof that correspond to the processed predictors.

In one embodiment, the computer processor includes an instruction shifter that obtains cache lines from an instruction buffer and isolates instructions from such cache lines. The decode control logic can be configured to process a given predictor at the head of the queue in order to control operation of the instruction shifter to obtain at least one cache line that contains one or more instructions of the instruction block or part thereof that corresponds to the given predictor. The decode control logic can also be configured to process the given predictor in order to control operation of the instruction shifter to isolate each instruction of the instruction block or part thereof that corresponds to the given predictor.

The apparatus can include mispredict logic that processes information related to execution behavior of the computer processor in order to detect a mispredict in the chain of predictors and start a new chain of predictors that initially follows the actual execution path of such execution behavior. The mispredict logic can be configured to update the predictor entries stored in the table based on the execution behavior of the computer processor.

The apparatus can further include a mechanism that stores predictor entries for a program and is configured to load such predictor entries into the table during execution of the program. The mechanism can be configured to load into the table predictor entries corresponding to a particular function in the event that computer processor experiences a taken mispredict with respect to a call operation to the particular function and the table does not include any predictor entries for the particular function. The mechanism can be further configured to update the predictor entries stored for the program in persistent storage for access the next time that the program is run.

The instruction blocks an include call operations and return operations. The instruction blocks can be partitioned into fragments, where each fragment begins with either the entry point of the instruction block or the return point from a call operation, and ends with either a call operation or a conditional or unconditional exit from the instruction block. Successive fragments of a given instruction block can be associated with keys that are arithmetically derivable from the key of the previous fragment.

At least one entry of the table can store an alternate key predictor corresponding to an execution path that does not exit a given instruction block or part thereof and corresponds to a misprediction of one other entry stored in the table. The alternate key predictor can be associated with an alternate key that is arithmetically derivable from the key associated with the one other entry.

DETAILED DESCRIPTION OF THE PREFERRED EMBODIMENTS

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "memory system" or "memory hierarchy" is a computer memory system storing instructions and operand data for access by a computer processor in executing a program. The memory system or memory hierarchy can be organized in a hierarchical arrangement of levels of memory with increasing access latency from the top level of memory closest to the computer processor to the bottom level of memory furthest away from the computer processor.

The term "cache line" is a unit of memory that is accessed by a computer processor. The cache line includes a number of bytes (typically 32 to 128 bytes) that are aligned on cache line boundaries.

Figure 1:
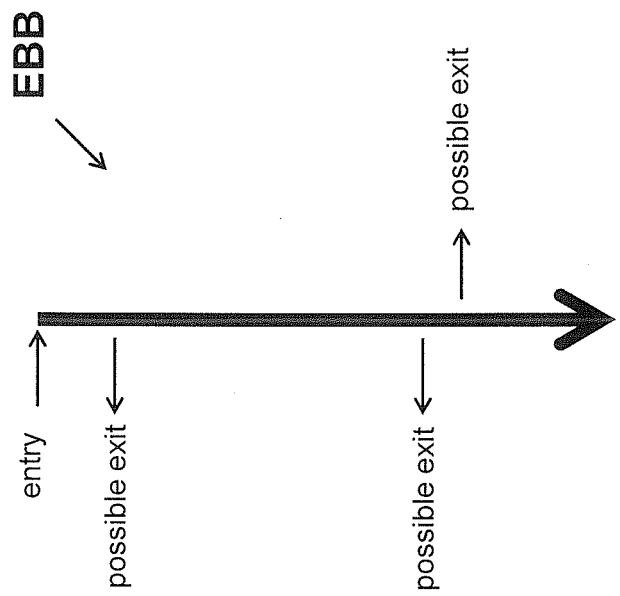
FIGS. 1 and 2 are schematic diagrams of an extended basic block of instructions or EBB according to the present disclosure.
Figure 2:
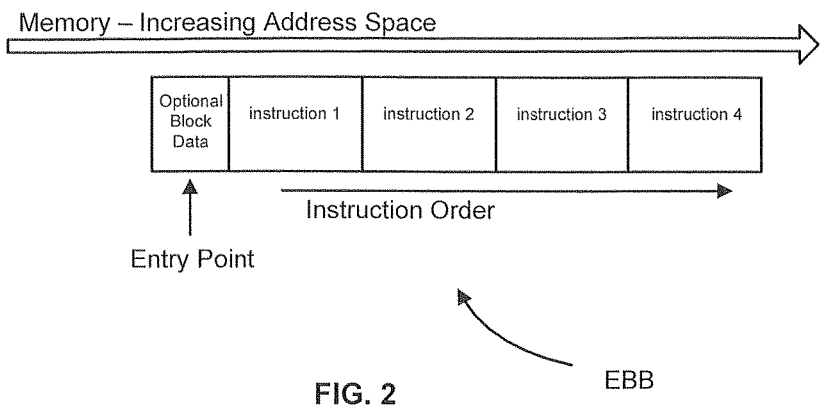
Figure 3:
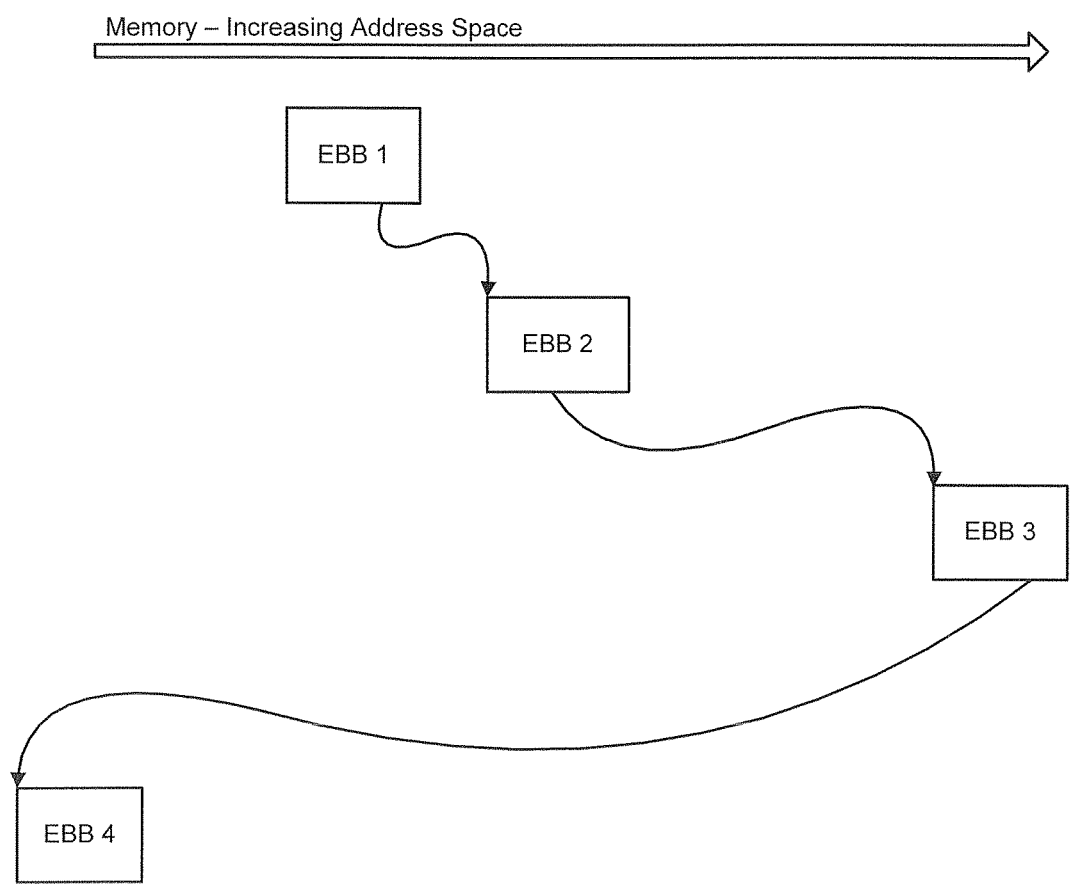
FIG. 3 is a schematic diagram illustrating the control flow of an illustrative program through a sequence of four EBBs.

The computer processor of the present application executes sequences of instructions organized as blocks of instructions (or "instruction blocks"). The instruction blocks can be extended basic blocks or "EBBs." Each given EBB is a sequence of instructions with a single entry point (the head of the EBB) and possibly one or several control transfer operations forming exit points as shown in FIG. 1. FIG. 2 shows an example of an EBB with a sequence of four instructions with an instruction order that logically extends in a direction of increasing memory address space relative to the entry point of the EBB. Control transfer operations in an EBB always transfer control to the head of some other EBB (or to the head of the same EBB, in the case of a single EBB loop) as shown in FIG. 3. The control transfer operations of the EBB do not transfer control into the middle of an EBB.

The control transfer operations of the EBB can be conditional control transfer operations, such as a conditional branch operation, conditional call operation or conditional return operation. The control transfer operations of the EBB can also be unconditional control transfer operations, such as an unconditional branch operation or jump operation, unconditional call operation or unconditional return operation. In this manner, the EBB is different from conventional program code that executes on other computer processors which do not have such restriction, where such instructions can typically be entered either because they are the target of a transfer, or because the previous instruction in sequence has been issued and control has fallen through, or both.

Necessarily from the definition of an EBB, the EBB includes at least one explicit control transfer operation and control never implicitly falls through the end of the EBB into the next EBB. Furthermore, the last instruction of the EBB can include an unconditional control transfer operation. Alternatively, the last instruction of the EBB can include balancing conditional control transfer operations that transfer control to one or more EBBs for all possible conditions specified by the last instruction of the EBB.

An EBB can also include one or more embedded call operations and associated return operations. The call and/or return operations can be conditional in nature or unconditional in nature. The semantics of the call operation and the return operation as defined by the Instruction Set Architecture of the computer processor can distinguish call and return operations from one another and from branch type operations and possibly other control transfer operations. The call operation can cause a break in the sequence of consecutive execution within the EBB. Thus, the execution of the call operation can be predicted similar to a branch or jump operation. Because an EBB may contain several call operations, executing an EBB can involve one or more sequences of instructions broken by calls leading to an exit point from the EBB. The exit point of the EBB can be a conditional branch operation, an unconditional branch or jump operation (which can be the last instruction of the EBB), a conditional or unconditional call operation, and/or a conditional or unconditional return operation. These sequences are referred to herein as EBB fragments. Note that if control enters an EBB then necessarily only one conditional branch operation (or one return operation) of the EBB will ever be taken to cause the program to exit from the EBB, although there may be many call operations in an EBB that causes the program to transfer control out of the EBB.

The computer processor also includes Prediction Logic that employs an Exit Table whose entries store predictors corresponding to EBB fragments that are executing on the computer processor. Each given Exit Table entry is associated with a key by which the given Exit Table entry may be accessed (looked up). The predictor corresponding to a given EBB fragment can include information that represents a predicted execution path that exits the given EBB fragment. In the case that the given EBB fragment is predicted to be exited by a branch operation, the predictor entry corresponding to the given EBB fragment is referred to herein as a branch-type predictor entry. In the case that the given EBB fragment is predicted to be exited by a call operation, the predictor entry corresponding to the given EBB fragment is referred to herein as a call-type predictor entry. In the case that the given EBB fragment is predicted to be exited by a return operation, the predictor entry corresponding to the given EBB fragment is referred to herein as a return-type predictor entry. The predictor for each given Exit Table entry can include an address field. For both branch-type and call-type predictor entries, the address field of the given Exit Table predictor entry represents the entry address of the target EBB (the EBB that is the target of the branch operation or the call operation). In this case, the address field of the Exit Table entry can be a logical offset of the entry address of the target EBB relative to a base address stored in a special purpose register of the computer processor or by an offset from the entry address of the exiting EBB corresponding to the predictor. For return-type predictor entries, the address field of the given Exit Table predictor entry is not an address but can contain information needed to continue the predictor chain at the point of the call operation in the subroutine being returned to. The address field of the given Exit Table entry can be used to derive the key to look up and access the Exit Table entry corresponding to the target EBB fragment. The predictor for each given Exit Table entry can also include information that represents the extent of the instructions of the corresponding EBB fragment that are predicted to be executed as stored in the memory system as well as other metadata as described herein. Note that the predictor for each given Exit Table entry can provide information that allows the decoding of the instructions of the EBB fragment corresponding to the given Exit Table entry.

The Prediction Logic of the computer processor is configured to access the Exit Table (and possibly an Exit Cache associated therewith) to generate and store a chain of predictors that refer to consecutive EBB fragments of the program to be executed by the computer processor. The chain of predictors is generated and stored ahead of the decode stage of the processor (a form of run-ahead prediction). The chain of predictors can be used for four primary purposes:
  i) to control prefetch operations that prefetch into cache the cache lines that include the instructions of the EBB fragments as referred to by the chain of predictors;
  ii) to control fetch operations that fetch such cache lines from cache into an instruction buffer or queue that feeds to the decode stage of the computer processor; and
  iii) to control read-out operations that read-out the sequence of instructions of the EBB fragments as referred to by the chain of predictors from the instruction buffer to the decode stage of the computer processor for decoding and follow-on execution; and
  iv) to control shifting operations that operate on cache lines to isolate each instruction of the EBB fragments as referred to by the chain of predictors for decoding and follow-on execution.

In generating the chain of the predictors, the address field of a predictor as part of an entry read-out from the Exit Table can be used to generate a key to look up and access the next predictor in the chain. The predictor information that represents the extent of the sequential instructions of a given EBB fragment for the chain of predictors can be used to control the prefetching, fetching, instruction buffer read-out, and instruction-shifting operations for the instructions of the given EBB fragment.

Figure 4:
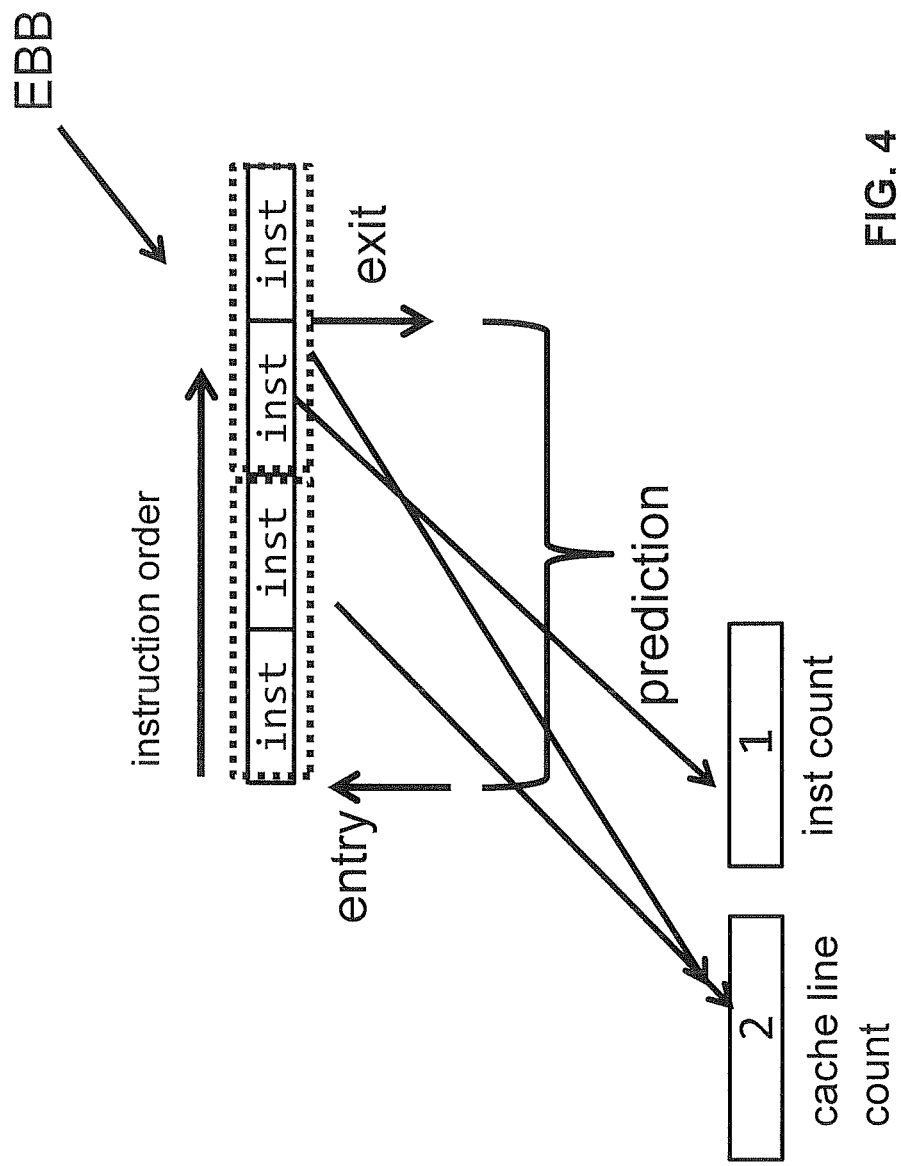
FIG. 4 is a schematic diagram of an illustrative EBB and corresponding predictor entry according to the present disclosure.

In one embodiment, the predictor information that represents the extent of the instructions of the EBB fragment that are predicted to be executed as stored in the memory system includes a cache line count field and an instruction count field as shown in FIG. 4. The cache line count field indicates the number of cache lines of the memory system that store the sequence of sequential instructions of the EBB fragment. The instruction count field indicates the number of instructions of the EBB fragment that are found in the last cache line of the EBB fragment. The cache line count field of a given predictor can be used in conjunction with the address of the EBB fragment to control the prefetching and fetching operations of cache lines that include the instructions of the EBB fragment. The instruction count field of the predictor can be used to control the read-out of the sequence of instructions of the EBB fragment from the Instruction Buffer to the decode stage as well as the instruction shifting that isolates instructions of the EBB fragment for further decode processing. Specifically, the instruction count field of the predictor can provide an indication of the number of instructions in the last cache line of the EBB fragment that are to read-out and isolated for decoding by the decode stage of the computer processor. Thus together the cache line count and instruction count can inform the decode stage when it has reached the end of the EBB fragment.

As described above, an EBB can contain many conditional branch-type control transfer operations that can possibly exit the EBB. However, only one of these conditional branch-type control transfer operations per EBB can be predicted taken by a corresponding entry in the Exit Table. Furthermore, in practice, the average number of conditional branch-type control transfer operations per EBB can vary by program and somewhat by compilation strategy, but a typical number is three. Consequently, for the same amount of program code, a conventional per-branch predictor requires three times as many total table entries as the prediction approach utilizing an Exit Table as described herein. This reduction in total table entries can provide i) a reduction in the area and power costs of prediction, ii) an increase in prediction accuracy due to keeping more information about each entry or more entries, and/or iii) lower latency in prediction.

Also note that the Exit Table can be configured such that entries of the Exit Table do not store predictions for never-taken conditional branch-type control transfer operations. In this case, control falls through to a later exit, which can be associated with a prediction stored as an entry in the Exit Table.

Furthermore, the control flow of the program can be organized such that the entries of the Exit Table corresponding to always-taken (or highly-taken) branch-type control transfer operations are minimized. Sometimes a compiler knows, by heuristics, profiling or other methods, that one direction of control flow of a particular branch-type control transfer operations is more likely than the other. In such a case, the compiler can use de Morgan's laws or other transformations to exchange the sense of test for the branch-type control transfer operation such that the most likely direction of control transfer becomes the fall-through case, and the taken path become the less likely case. This results in program code with longer average executions in a given EBB fragment before exit, fewer predictions to maintain, and better utilization of the Exit Table and associated hardware.

Furthermore, the Exit Table can possibly be configured to omit any entries corresponding to unconditional branch-type operations that have statically knowable target addresses. In this case, the CPU can be configured to isolate and interpret the unconditional branch operation that will cause the exit from the EBB such that the decode stage receives the target EBB of the unconditional branch instruction with minimal delay. This approach can be difficult when used in conjunction with in-order issuance with a short decode pipeline.

EBB Fragments

As described herein, EBBs are linear segments of program code with a single entry point (entry address) and one or more possible exit points. One or more predictions corresponding to a given EBB can be stored as entries in the Exit Table. Each such prediction includes an address field, which can be used to obtain the entry address of the predicted next EBB in the program code. Moreover, EBBs can include one or more embedded call operations. Such a call operation can transfer control to another EBB (the first EBB of the called subroutine). The call operation can be conditional in nature (executed when certain condition(s) are satisfied similar to a conditional branch operation) or can be unconditional in nature (always executed similar to an unconditional branch or jump operation). The Exit Table can include an entry storing a predictor for each unconditional call operation in an EBB. The Exit Table can also include an entry storing a predictor for each conditional call operation in an EBB. In each case, the address field of the predictor can be used to obtain the entry address of the first EBB of the called subroutine.

Note that the final EBB (and possibly other EBBs) of the called subroutine will include a return operation that is intended to transfer control to the point of the call operation in the EBB of the program code being returned to. The Exit Table can include an entry storing a predictor for such return operation. This Exit Table entry can be used to link to another Exit Table entry that corresponds to the point of the call in the EBB of the program code being returned to. This Exit Table entry (corresponding to the point of the call in the EBB of the program code being returned to) can include a predictor for another call operation, another return operation (as part of nested Call program structure), a conditional branch operation, or an unconditional branch operation (such as a final exit of the EBB). For the case where the predictor refers to a second call operation, the Exit Table can include an additional entry that follows the return control flow from the called subroutine to the point of the second call in the EBB of the program code being returned. This structure can be repeated for additional call/return operations when present.

In this manner, the EBB can be partitioned into EBB fragments, where each EBB fragment begins with either the entry point of the EBB or the return point from a call operation, and ends with either a call operation or a conditional or unconditional exit from the EBB. Note that an EBB may include a single EBB fragment. The Exit Table can potentially store an entry with a predictor for each EBB fragment.

The key used to look up the initial EBB fragment of an EBB can correspond to the entry address of the EBB as described herein. The key used to look up subsequent EBB fragments of the EBB (such EBB fragments corresponding to the return point of a call operation) could possibly correspond to the address of the return point of the call operation. However, these return addresses can be ambiguous in certain instances (such as in the presence of vacancies). Thus, in one embodiment, a mathematical model is used to generate the keys used to look up EBB fragments that correspond to the return point of respective call operations. Many different mathematical models are possible. It is desirable that the mathematical model guarantees that the key of any such EBB fragment is distinct from all other keys. An example of a suitable mathematical model involves subtracting two from the key of the previous EBB fragment to obtain the key of the next subsequent EBB fragment. This algorithm guarantees uniqueness because for there to be such an EBB fragment there must have been a call operation encoded in the EBB. Furthermore, in this example, the call operations are located at decreasing addresses from the entry point of the EBB, and necessarily occupy more than two bytes of code. Hence, the "previous key minus 2" model generates a new key that points to address space that lies within the code of the EBB and cannot collide with the entry address of an adjacent EBB in memory.

Exemplary Format of the Predictors

Figure 5:
FIG. 5 is a schematic diagram of an exemplary embodiment of an Exit Table predictor entry according to the present disclosure.

As described above, the Exit Table stores entries that define predictors corresponding to the EBB fragments of a program that is to be executed by the computer processor. Each given Exit Table entry is associated with a key by which the given Exit Table entry may be accessed (looked up). In one exemplary embodiment, each predictor can include at least one of the following fields as show in FIG. 5:

1) an address field that points to entry address of the target EBB for branch and call-type predictors (or information that refers to the point of the call in the target EBB for a return-type predictor); furthermore, the memory address of the first cache line of target EBB fragment target can be derived from the address field of the Exit Table entry;

2) a Cache Line Count value that specifies the extent (in number of Cache Lines) of the corresponding EBB fragment in memory;

3) an Instruction Count value that specifies the number of instructions in the last cache line of corresponding EBB fragment; this specifies the number of instructions to be decoded in the last cache line before transfer out of the corresponding EBB fragment to the target EBB fragment as pointed to by the address field of the Exit Table entry;

4) an indicator of the expected kind of control transfer operation out of the corresponding EBB fragment to the target EBB fragment for the predictor; for example, the indicator can specify one of a branch operation, a call operation or a return operation;

5) a count of the number of untaken conditional call operations that the EBB fragment contains;

6) a number of key check bits that can be used to detect hashing collisions when accessing the Exit Table;

7) information about the quality of the prediction defined by the predictor, such as an estimate of how likely the predictor is to be correct; and 8) loop information for the target EBB fragment, including a head of loop marking and a loop iteration count, which is a predicted iteration count for EBBs that are the head of loops.

The meaning and purpose of each of these fields is discussed below.

Predictor Address Field

The address field of the predictor points or refers to another Exit Table entry corresponding to a target EBB fragment. This reference can be embodied by the memory address of the target EBB fragment, or its logical offset from some well-defined base address such as the beginning address of the code in the load module being executed. Unfortunately, memory addresses are large and it is very desirable to keep prediction data small to economize on hardware for tables. Alternatively, the reference can be embodied by an offset from the entry address of the exiting EBB corresponding to the predictor. This self-relative offset permits code to be located anywhere in memory without requiring relocation of prediction target addresses. In addition, the compiler or other code generator can sort the EBBs of the program using a topological sort, which has the effect of placing the target EBB fragment close to the exiting EBB in memory. This sort lowers the average offset when using self-relative offsets, which means that larger programs will overflow the fixed size of the predictor address field less often, permitting smaller address fields (and fewer hardware bits) in the Exit Table. Note that when overflow does occur anyway, the address field of the predictor can be to its maximal value, and the predictor logic can ignore the address field information while still using the rest of the predictor, if possible.

As described herein, the computer processor includes hardware circuitry (Predictor Logic) that accesses the Exit Table to generate and store a chain of predictors that refer to consecutive EBB fragments of the program to be executed by the computer processor. The chain of predictors is generated and stored ahead of the Decode Stage (a form of run-ahead prediction). In generating the chain of the predictors, the address field of a predictor as read from the Exit Table can be used to generate to a key that is used to look up and access the next predictor in the chain.

Predictors corresponding to call and branch operations reflect a transfer to the initial EBB fragment (entry address) of some target EBB, and so the address field of such predictors refers to another Exit Table entry corresponding the initial EBB fragment of the target EBB. Predictors corresponding to return operations reflect a transfer to the return point of a call operation. This return point does not correspond to an initial EBB fragment as the corresponding call operation ended the initial fragment if it occurred there. Thus, the transfer is to some fragment in the EBB of the call operation being returned to. In this case, the key for the EBB fragment of the call operation being returned to can be provided by access to the top most entry of the Return Stack as described herein. Alternatively, the top most entry of the Return Stack can supply the entry address of the caller EBB address and an untaken call-count. These two values can be used to derive the key for the EBB fragment of the call operation being returned to be used to. Note that this return key may need to be transformed into an actual address in order to perform prefetching and fetching operations with respect to the EBB fragment being returned to. Such key-to-address transformation is described below in more detail. The top most entry of the Return Stack can also supply the return address of the return operation such that the key-to-address transformation can be avoided.

Predictor Cache Line Count

As described herein in the illustrative computer processor, instructions are fetched from cache of a hierarchical memory system and stored in an Instruction Buffer. The Decode Stage is fed instructions out of the Instruction Buffer. In typical caches, the contents are kept as an array whose elements are of a fixed granularity called the cache line. A typical cache line size is 64 bytes. These cache lines need have no relations to instruction boundaries. Thus, a single instruction can cross one or more cache line boundaries depending on the size of the instruction. When an EBB fragment is executed, it will require instructions from some number of cache lines before it exits (or is predicted to exit) and will not require subsequent cache lines containing instructions beyond this exit point (even if the EBB exits well before the predicted exit point). It is advantageous that the requisite cache lines are accessible in the cache. This allows the Decode Stage to process the sequence of instructions of the EBB fragment at full speed.

The computer processor can employ a Prefetcher (e.g., a hardware unit) that is configured to use the address field and the predictor cache line count value for the chain of predictors read from the Exit Table in order to prefetch into cache the cache lines that include the instructions of the EBB fragments as referred to by the chain of predictors. More specifically, the address field of a given predictor is used to derive the memory address for the starting cache line of a corresponding EBB fragment. The Prefetcher uses the memory address for the starting cache line of the corresponding EBB fragment to fetch such starting cache line into cache (if not already in cache). The Prefetcher can then apply offsets to the base memory address of the starting cache line such that the Prefetcher fetches the additional cache lines of the corresponding EBB fragment into cache (if not already in cache), where the number of additional cache lines and corresponding offsets are dictated by the line count value of the given predictor. Note that the prefetch operations are carried out over an exact number of cache lines that are part of the EBB fragment. This is an exact prefetch as the exact number of needed cache lines will be loaded into cache if not already in cache.

Such exact prefetch operations are different from blind prefetch operations commonly employed by computer processors in an attempt to bring needed cache lines into the cache before they are decoded and subsequently executed. In the blind prefetch strategy, if control is transferred to some memory address and the target line is not in cache, the computer processor will not only load the target cache line from main memory into cache but will also load several additional cache lines (after the target cache line) from main memory into cache in case the additional cache lines might be needed. The exact prefetch operations can avoid wasting cache space on cache lines that are loaded speculatively and not used as a result of the blind prefetch strategy.

The cache line count field of the predictor can have a predefined fixed size, and the size of the EBB fragment referred to by the cache line count field might be too big to fit in the fixed size of the cache line count field. In such a case, a saturated value (i.e., the largest value the cache line count field can hold) can be used for the cache line count field for the predictor, which serves to indicate an overflow condition to the computer processor. This overflow condition can be addressed as follows.

The cache line count for the overflowing EBB fragment can be derived from the overall length in cache lines of the whole EBB, i.e. the overflow predicts that exit will be from the final cache line of the EBB. The overall length in cache lines of the whole EBB can possibly be derived from metadata located at the entry point of the EBB and possibly incremented by explicit operations contained in the executed instruction stream. Thus the overflowed count is a pessimistic estimate. Unless the EBB is executed all the way to the end before exiting, the actual exit will find that some unneeded cache lines have been fetched and some unneeded instructions have been decoded. These are discarded, and the Decode Stage resumes at the actual target of the overflowing EBB fragment.

Predictor Instruction Count

The Decode Stage of the Processor can operate at full speed (and optimal efficiency) when instructions flow to the Decode Stage as a continuous stream, without pauses at transfers between EBB fragments. That is, when the Decode Stage is working on the last instruction before the predicted exit of an EBB fragment, the next instruction that is to be decoded as stored in the Instruction Buffer should be the first instruction of the next EBB fragment. In this case, the Decode Stage needs to know not only the target address of the next instruction (where the next instruction will be found) but also which instruction is the one that will perform the exit from the current EBB fragment.

There are several possible ways to convey the "exit is here" information. For example, the predictor entry can possibly contain a count of the number of instructions to decode between entry and exit of the EBB fragment. Or the predictor can possibly contain the address or offset of the exiting instruction. Or on a statically scheduled machine the predictor can possibly contain a count of the number of cycles spent in the EBB fragment. This might appear to be the same as the number of instructions executed in the EBB. The limitation with all of these indicators is that they are large, and space in the Exit Table is at a premium. However, the indicator can be compressed by noting that necessarily the exit will be from some instruction that ends in the last predicted line. Consequently, the exit can be takes as an instruction count from the point at which the final cache line of the respective EBB fragment enters decode, rather than from the start of the respective EBB fragment. Consequently, the instruction count field of the predictor cannot be larger than the maximum number of instructions that can be encoded in a single cache line. In practice, the size of the instruction count field of the predictor can be made large enough to express nearly all instruction counts that appear in average code.

The instruction count field of the predictor can have a predefined fixed size, and a run of very short instructions might require an instruction count that exceeds the fixed size of the instruction count field. In such a case, a saturated value (i.e., the largest value the instruction count field can hold) can be used for the instruction count field for the predictor, which serves to indicate an overflow condition to the computer processor. This overflow condition can be addressed as follows.

The overflow of the instruction count causes the Decode Stage to continue with decode past the overflowed count, and to switch to the next EBB fragment when the next instruction to be decoded would require another cache line. This may be (luckily) the correct exit instruction. The chance that it is correct is equal to the ratio of average instruction size to cache line size. In the absence of luck, the Decode Stage will have shifted more instructions than needed and the decoder will discover the mispredict when the exiting operation is executed. Assuming that the next EBB fragment was correct and only the count was wrong, the target instruction and the following instruction chain is somewhere up the decode pipeline and all that needs to be done is to discard the uselessly decoded instructions between the exiting instruction and its target instruction, which is cheaper than a full mispredict in which the prediction has the wrong target address as well as wrong counts.

Predictor Kind Indicator

The predictor can include an indicator of the expected kind of control transfer operation out of the corresponding EBB fragment to the target EBB fragment for the predictor. The categories of kind indicators can depend on the details of the instruction formats and decode process. In one illustrative example, the categories of kind indicators include a "branch" kind for conditional branch operations, a "jump" kind for unconditional branch operations, a "return" kind for return operations, an "inner-call" kind for call operations that will return to the instruction containing the call (an inner call), and an "outer-call" kind for call operations that will return to the following instruction (an outer call). Many aspects of prediction vary slightly based on the kind of transfer being predicted, as described elsewhere where the difference arise.

Predictor Untaken Call Count

As described herein, the key for the initial EBB fragment of an EBB corresponds to the entry address of the EBB, and the key for successive EBB fragments (that follow the initial EBB fragment) in the EBB can be defined by a mathematical model by subtracting two from the key of the previous EBB fragment. Each EBB fragment but the last can end with a call operation, so the key of such EBB fragments can be derived from the entry point address minus twice the number of call operations encoded between the entry point and the fragment whose key is being determined. The count of call operations executed in an EBB can be maintained by the computer processor. In the case that the computer processor supports both unconditional and conditional calls, the mathematical model for defining keys for call operations needs to adjust the entry address by the count of both encoded conditional and unconditional call operations, not the count of executed calls. Note that the two counts may differ if the EBB contains untaken conditional call operations.

Operation execution can maintain an accurate count of call operations as of execution. However, prediction chaining requires keys as of prediction, i.e. as of isolation of instructions for decoding. This count may differ from the execution count if there are untaken calls that are being decoded but have not yet reached execution.

To avoid untaken calls causing wrong keys, the predictor entries include an untaken call count field. A call operation count for an EBB can be found by adding the count of predicted-taken call operations for the EBB fragments of the EBB (i.e., the number of "call" kind predictions in the chain of predictor entries for the EBB fragments of the EBB) to the cumulative untaken call counts for the EBB fragments of the EBB (i.e., the cumulative value of the untaken conditional call count values in the chain of predictor entries for the EBB fragments of the EBB). The call operation count can be derived as follows. The predictor for each EBB fragment includes an untaken call count value for that EBB fragment, which exits by a predicted taken call operation. If the predictor(s) for the EBB are correct, then the sum of the number of EBB fragments back to the beginning of the EBB (the number of predictions in the chain) plus the sum of all the untaken call count values for this number of EBB fragments will be the number of call operations (both taken and untaken) in the program since the original entry into the EBB. This is the call operation count and it can be maintained by the Decode Control Logic. In this case, the next key for the Exit Table entry that predicts the next EBB fragment is the entry key of the EBB (which can be stored upon entry) less the product of two times the call operation count.

If there is a misprediction then the call operation count in the failing key is also incorrect. However, the execution logic can be configured to keep a count of executed (not necessarily taken) call operations, which can be used to compute the correct key for the Exit Table entry that predicts the next EBB fragment.

Predictor Key Check Bits

As described herein, the Exit Table is a repository in which entries that define predictors are stored and accessed by a key look up operation. In one embodiment, the Exit Table can be implemented as a hardware-based direct-mapped hash table for which the key is an EBB address modified as described later. However many other implementations could be used without altering the function of the Exit Table as described herein.

When the Exit Table is implemented as a direct-mapped hash table, hash collisions can occur in accessing the Exit Table. That is, the key that points to the predictor entry for one EBB can also map to a predictor entry for some other EBB, leading to a prediction wildly at variance with the way the keyed EBB will actually behave. Such hash collisions can be detected by storing the actual key of the entry together with the predictor data and checking the entry key against the search key. If the keys match, this indicates that no hash collision has occurred. In this case, the table access can be treated as hit and the predictor data of the matching entry can be read-out for processing as desired. The hit can be reported to indicate the presence of an Exit Table entry corresponding to the search key. If the keys do not match, this indicates that a hash collision has occurred. In this case, the table access can be treated as a miss and the read-out of the predictor data of the matching entry can be blocked or otherwise treated as invalid. The miss can be reported to indicate the lack of an Exit Table entry corresponding to the search key.

However, keys are relatively large and the consequences of a hash collision, while lowering performance somewhat, are not disastrous. This leads to an embodiment where the predictors of the entries of the Exit Table are configured to store a pre-defined number (such as three) of the bits of the actual key in the entry, rather than the whole key, as check bits. Hash collisions can be detected by checking the stored key check bits of the entry key against the corresponding bits of the search key. If these bits match, this is interpreted as an indication that no hash collision has occurred. In this case, the table access can be treated as hit and the predictor data of the matching entry can be read-out for processing as desired. The hit can be reported to indicate the presence of an Exit Table entry corresponding to the search key. If the bits do not match, this can be interpreted as an indication that a hash collision has occurred. In this case, the table access can be treated as a miss and the read-out of the predictor data of the matching entry can be blocked or otherwise treated as invalid. The miss can be reported to indicate the lack of an Exit Table entry corresponding to the search key. The use of such key check bits can detect most hash collisions while not increasing entry size excessively. Thus, for example, three check bits per predictor entry can detect all but one in eight potential hash collisions, and correctly report them as lacking Exit Table entries corresponding to the search key.

Predictor Quality Information

Each predictor entry of the Exit Table can include information about the quality of the prediction defined by the predictor entry, such as an estimate of how likely the prediction is to be correct. An EBB that exits only by a single unconditional branch will have a prediction that is 100% accurate, while one that can and does exit from any of several conditional branches may have a prediction that is relatively unlikely to be correct, even if the prediction is the most likely of the alternatives. Moreover, program transfer behavior frequently changes during execution. For example, during one phase of execution, an EBB fragment may usually exit via a branch operation A, but in a later phase of execution, the same EBB fragment may usually exit via another branch operation B. Such variability makes it desirable for the prediction for the EBB fragment to change over time, so as to track the most likely exit based on the recent behavior.

Thus, program execution of the EBB fragments can be used to update the quality information of the corresponding predictor entries as stored in the Exit Table and then modify the predictions defined by the predictor entries themselves when warranted by the quality information. Specifically, when a prediction defined by an Exit Table entry is successful, i.e., execution of the EBB fragment corresponding to the Exit Table entry did in fact exit at the predicted point and to the predicted target, the key for such EBB fragment can be used to access the Exit Table entry and raise the quality information of the predictor entry as appropriate. When a prediction defined by an Exit Table entry is not successful (a mispredict), i.e., execution of the EBB fragment corresponding to the Exit Table entry did not in fact exit at the predicted point and to the predicted target, the key for such EBB fragment can be used to access the Exit Table entry and lower the quality information of the predictor entry as appropriate. In the case of a mispredict, the execution behavior carries information that defines the prediction that would have been correct for that key. If the quality information for the Exit Table entry drops below a replacement threshold, the prediction defined by the Exit Table entry can be replaced by the corrected prediction carried by the execution behavior. This same replacement operation is performed in the event that the Exit Table does not have any entry corresponding to the key.

Besides being updated by ongoing execution behavior, the predictor entries of the Exit Table can also be updated by a bulk prediction load operation as described below in more detail.

In one embodiment, the quality information of the prediction defined by the predictor entry can be represented by a one-bit or two-bit saturating counter that is part of each predictor entry. The counter can be updated based on the execution behavior of the corresponding EBB fragment. If the prediction defined by a predictor for a given EBB fragment is found to have been correct during execution of the given EBB fragment, i.e. the EBB fragment did in fact exit where it was expected to, the counter can be incremented (unless saturated at the maximum count value). However, if the prediction defined by a predictor for a given EBB fragment is found to have been incorrect during execution of the given EBB fragment, i.e. the EBB fragment did not in fact exit where it was expected to, the counter can be decremented. If the counter saturates down (i.e., its count was already at the minimum count value), then the predictor of the entry can be updated to predict what would have been the correct prediction and (in most variations) the counter is incremented again. The effect of the counter is that the predictor entry remains in the Exit Table if it is usually correct, but if is incorrect for more than a few consecutive predictions then it will be replaced. In one example, the quality information of the predictor can be defined by a single bit, indicating strong confidence and weak confidence in the prediction. This allows the predictor entry for a corresponding EBB fragment to miss (predict wrong) twice in a row before being replaced by an updated prediction. In other examples, the quality information of the predictor can be defined by multiple bits so as to provide finer divisions of confidence.

Predictor Head of Loop Marking and Loop Iteration Count

Common branch prediction schemes detects loops by recognizing the bottom of a loop because it branches to a recent target address of a previous branch. The target is assumed to be the loop head. The branch predictor allocates a loop counter, and counts the number of iterations until a branch to the loop head is mispredicted, which is assumed to be the loop exit. This first execution of the entire loop is called a training execution. The branch predictor saves the counter value and the head address. The next time it encounters a branch to the head it assumes that the loop is being re-entered, retrieves the saved count, and counts it down with each branch to the head predicting that the branch will be taken. When the counter exhausts (i.e., when the second execution of the loop has iterated as many times as the first training execution) it changes the prediction to untaken in the expectation that the loop will again exit after the same number of iterations. If the loop prediction is correct then both the iteration branch and the exit branch will be correctly predicted, avoiding the mispredict at loop exit that is inevitable in the absence of loop prediction.

There are obvious limitations to this loop branch prediction strategy. For example, the loop may vary in its iteration count, both for while-loops and also for fixed length loops such as when iterating over triangular matrices. Then a loop may not be executed a second time after it has been first counted, or the saved state may be overwritten by other loops before it is reused. Lastly, the detection of a looping structure is subject to false positives while the detection of loop exit is subject to false negatives. There are many schemes proposed and in use to track and improve the quality of loop prediction, which work more or less well. Nevertheless it is common for modern CPUs to include loop prediction, if only to achieve better results on matrix algebra benchmarks.

Loop prediction as described above can be improved by the construct of the Exit Table predictor entries as described herein. Specifically, when the predictor entries of the Exit Table are generated for a later bulk load operation as described herein, the tool chain (i.e., the code generator) knows from the source code of the program what constructs constitute fixed-length loops. In some cases, the number of iterations is statically known. In other cases, it may be known from profiling. In yet other cases, the length is unknown but is known to be fixed. Furthermore, the tool chain knows which EBB fragments constitutes the head of the loop. Such head EBB fragments can be associated with predictor entries of the Exit Table, which are marked as head of loop prediction together with an expected loop iteration count as best the tool chain can determine.

Furthermore, the Prediction Logic can be configured to detect when the prediction chain includes a predictor entry that refers to an EBB fragment marked as a head of a loop. In this case, the Prediction Logic allocates an iteration counter for processing the EBB fragment which is initialized with the expected loop iteration count as specified by the predictor entry and pushes the predictor and associated iteration counter onto the hardware loop stack. Each predicted control transfer operation is then checked against the top entry on the loop stack. A match indicates a branch operation to the head of the loop. On a match, the iteration counter is decremented and the regular prediction is used. In the event that at the decrement clears the iteration counter to zero then the alternate prediction is used instead of the regular prediction, predicting that the execution will fall through the branch operation and the loop will exit.

If the execution of the loop exit occurs as predicted, then the top entry is popped from the loop stack and the quality information of the alternate prediction is upgraded normally. However, if the exit prediction mispredicts (i.e., the loop continued iterating longer than expected), then the iteration counter continues decrementing, wrapping around. With a non-zero wrapped iteration counter, the prediction resumes predicting that the iteration will continue. Eventually the loop will exit, causing a mispredict. The correct iteration count for the loop can be determined from the value in the iteration counter and the original predicted iteration count of the predictor entry. If this correct iteration count is small enough to fit in the loop count information field of the corresponding predictor entry, then the predictor entry is updated with the correct iteration count and the predictor quality rating is adjusted normally. The same adjustment process is followed if the loop exits early. Here the correct iteration count can be determined from the count value remaining in the iteration counter at loop exit and the original predicted iteration count of the predictor entry. The predictor entry is then updated with the correct iteration count and the predictor quality rating is adjusted normally.

The corrected iteration count values of the predictor entries of the Exit Table can be copied to lower levels of the prediction hierarchy and, when possible, back to the load module for use in subsequently runs of the same program. Thus, the loop prediction mechanism as described herein does not require a training execution for statically predictable loops, and is self-profiling for loops with dynamic but constant iteration counts. False positive loop detection can be avoided because only tool-chain specified loops use loop prediction. False negative predictions can possibly occur, and will occur when a branch operation that is predicted to return to the loop head does not, but rather than fall-through and exit the loop, the control continues to code that eventually does return to the head of the loop. Code reorganization by the tool chain can remove branches that can display such behavior, at the cost of introducing an extra EBB in the loop body.

Relatively few EBBs will be part of loops and so have useful loop counts. As a result, the bits used for marking the entry and storing the predicted loop iteration count would appear to be wasted in the Exit Table for entries that correspond to EBB fragments that are not part of a loop. There are several possible ways to avoid this waste.

In one embodiment, the Exit Table can be split into two parts, with entries corresponding to EBB fragments that are part of a loop in one part and entries corresponding to EBB fragments that are not part of a loop in the other part. Both parts of the Exit Table can be accessed in parallel for a matching predictor entry. The entries corresponding to EBB fragments that are not part of a loop in the other part of the Exit Table can avoid the bits used for marking the entry and storing the predicted loop iteration count.

In another embodiment, the predictor entries corresponding to EBB fragments that are part of a loop and the predictor entries corresponding to EBB fragments that are not part of a loop are stored in a single table (without the bits used for marking the entry and storing the predicted loop iteration count). A side table is configured to store the loop head markings and the predicted loop iteration counts for EBB fragments that are part of a loop. Again, both tables are queried in parallel for matching predictor information.

Alternate Key Predictor Entry

The Exit Table predictor entries corresponding to certain EBB fragments can store predictor information associated with an alternate key. Such alternative key predictor entries store predictors for an alternate execution path within the corresponding EBB fragment where control passes as a result of an untaken mispredict (where the execution path falls through rather than transferring out of the EBB fragment as predicted by the "regular" key predictor entries corresponding to the EBB fragment). The alternate key predictor entry can permit mispredict recovery to get back on track without suffering a second mispredict (which would otherwise happen when the fall-through code eventually itself exited) and without over-fetching from the dummy predictors that are used for mispredicts without alternate keys.

Of course, the execution path dictated by the alternate key predictor entry may itself result in an untaken mispredict. In this case, default dummy recovery operations can be performed. Still, the availability of alternate keys reduce the cost of common control forms such as exits from loops that have the exit test at the bottom of the loop, and from if-then-else saddle constructions in which the taken path is the more commonly predicted.

The value of the key for an Alternate Key Exit Table predictor entry corresponding to given EBB fragment can be derived numerically from the value of the key of the regular Exit Table predictor entry corresponding to given EBB fragment. Many possible algorithms can be used to generate the alternate key, and the algorithm used should guarantee that no alternate key will collide with any other key. In one embodiment, the alternate key is derived by subtracting one from the value of the key of the regular Exit Table predictor entry. This permits successive EBB fragments (which can differ numerically by two) to each have their own alternate key.

Illustrative CPU

Figures 6, 7:
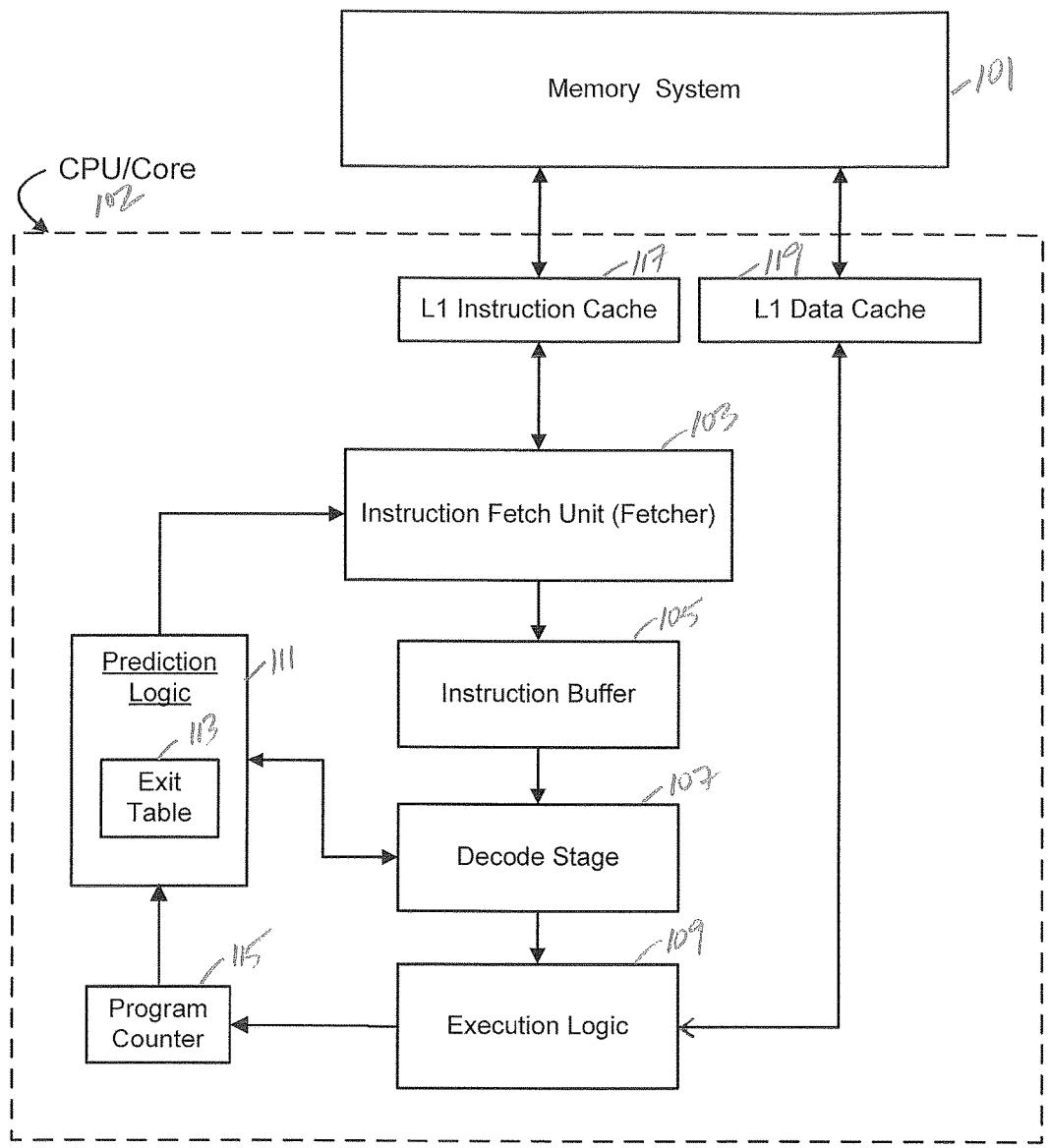
FIG. 6 is a schematic block diagram of a computer processing system according to an embodiment of the present disclosure.
FIG. 7 is a schematic diagram of exemplary pipeline of processing stages that can be embodiment by the computer processor of FIG. 6.

In accordance with the present disclosure, a sequence of instructions organized as EBBs is stored in a Memory System 101 and processed by a CPU (or Core) 102 as shown in the exemplary embodiment of FIG. 6. The CPU (or Core) 102 includes a number of instruction processing stages including at least one Instruction Fetch Unit or Fetcher (one shown as 103), at least one Instruction Buffer (one shown as 105), at least one Decode Stage (one shown as 107) and Execution Logic 109 that are arranged in a pipeline manner as shown. The CPU (or Core) 102 also includes Prediction Logic 111 that employs an Exit Table 113, at least one Program Counter (one shown as 115), at least one L1 Instruction Cache (one shown as 117), and an L1 Data Cache 119.

The L1 Instruction Cache 117 and the L1 Data Cache 119 are logically part of the hierarchy of the Memory System 101. The L1 Instruction Cache 117 is a cache memory that stores copies of instruction portions stored in the Memory System 101 in order to reduce the latency (i.e., the average time) for accessing the instruction portions stored in the Memory System 101. In order to reduce such latency, the L1 Instruction Cache 117 can take advantage of two types of memory localities, including temporal locality (meaning that the same instruction will often be accessed again soon) and spatial locality (meaning that the next memory access for instructions is often very close to the last memory access or recent memory accesses for instructions). The L1 Instruction Cache 117 can be organized as a set-associative cache structure, a fully associative cache structure, or a direct mapped cache structure as is well known in the art. Similarly, the L1 Data Cache 119 is a cache memory that stores copies of operands stored in the memory system 101 in order to reduce the latency (i.e., the average time) for accessing the operands stored in the Memory System 101. In order to reduce such latency, the L1 Data Cache 119 can take advantage of two types of memory localities, including temporal locality (meaning that the same operand will often be accessed again soon) and spatial locality (meaning that the next memory access for operands is often very close to the last memory access or recent memory accesses for operands). The L1 Data Cache 119 can be organized as a set-associative cache structure, a fully associative cache structure, or a direct mapped cache structure as is well known in the art. The hierarchy of the Memory System 101 can also include additional levels of cache memory, such as a level 2 cache, level 3 cache, as well as main memory. One or more of these additional levels of the cache memory can be integrated with the CPU 102 as is well known. The details of the organization of the memory hierarchy are not particularly relevant to the present disclosure and thus are omitted from the figures of the present disclosure for sake of simplicity.

The Program Counter 115 stores the memory address for a particular instruction and thus indicates where the instruction processing stages are in processing the sequence of instructions. This memory address can be derived from a predicted (or resolved) target address of a control-flow operation (branch or call operation), the saved address in the case of a return operation, or the sum of memory address of the previous instruction and the length of previous instruction. The memory address stored in the Program Counter 115 can be logically partitioned into a number of high-order bits representing a cache line address ($ Cache Line) and a number of low-order bits representing a byte offset within the cache line for the instruction.

The Prediction Logic 111 employs an Exit Table 113 whose entries stores predictors corresponding to EBB fragments that are executing on the CPU 102. The Prediction Logic 111 is configured to access the Exit Table 113 (and possibly an Exit Cache associated therewith) to generate and store a chain of predictors that refer to consecutive EBB fragments of the program to be executed by the CPU 102. The chain of predictors is generated and stored ahead of the Decode Stage 107. The chain of predictors can be used to control prefetch operations that prefetch into cache the cache lines that include the instructions of the EBB fragments as referred to by the chain of predictors. The chain of predictors can also be used to control fetch operations carried out by the Fetcher 103 that fetch such cache lines from the L1 Instruction Cache 117 into the Instruction Buffer 105. The chain of predictors can also be used to control read-out operations that read-out the sequence of instructions of the EBB fragments as referred to by the chain of predictors from the Instruction Buffer 105 to the Decode Stage 107 as well as to control shifting operations that operate on cache lines to isolate each instruction of the EBB fragments as referred to by the chain of predictors for decoding and follow-on execution. During start-up and mispredict recovery, the new chain of predictors begins at the target memory address stored by the program counter 115.

The Fetcher 103, when activated, sends a memory request to the L1 Instruction Cache 117 to fetch a cache line from the L1 Instruction Cache 117 at a specified cache line address ($ Cache Line). This cache line address can be derived from the predictors of the chain generated by the Prediction Logic 111. The L1 Instruction Cache 117 services this request (possibly accessing lower levels of the memory system 101 if missed in the L1 Instruction Cache 117), and supplies the requested cache line to the Fetcher 103. The Fetcher 103 passes the cache line returned from the L1 Instruction Cache 117 to the Instruction Buffer 105 for storage therein.

The Decode Stage 107 is configured to decode one or more instructions stored in the Instruction Buffer 105. Such decoding generally involves parsing and decoding the bits of the instruction to determine the type of operation(s) encoded by the instruction and generate control signals required for execution of the operation(s) encoded by the instruction by the execution/retire logic 109.

The Execution Logic 109 utilizes the results of the Decode Stage 107 to execute the operation(s) encoded by the instructions. The Execution Logic 109 can send a load request to the L1 Data Cache 119 to fetch data from the L1 Data Cache 119 at a specified memory address. The L1 Data Cache 119 services this load request (possibly accessing the lower levels of the memory system 101 if missed in the L1 Data Cache 119), and supplies the requested data to the Execution Logic 109. The Execution Logic 109 can also send a store request to the L1 Data Cache 119 to store data into the memory system at a specified address. The L1 Data Cache 119 services this store request by storing such data at the specified address (which possibly involves overwriting data stored by the data cache and lowering the stored data to lower levels of the hierarchical memory system).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 7.

In the fetch stage, the Fetcher 103 sends a request to the L1 Instruction Cache 117 to fetch a cache line from the L1 Instruction Cache 117 at a specified cache line address ($ Cache Line). The Fetcher 103 passes the cache line returned from the L1 Instruction Cache 117 to the Instruction Buffer 105 for storage therein.

The Decode Stage 107 decodes one or more instructions stored in the Instruction Buffer 105. Such decoding generally involves parsing and decoding the bits of the instruction to determine the type of operation(s) encoded by the instruction and generating control signals required for execution of the operation(s) encoded by the instruction by the Execution Logic 109.

In the issue stage, one or more operations as decoded by the Decode Stage 107 are issued to the Execution Logic 109 and begin execution.

In the execute stage, issued operations are executed by the functional units of the Execution Logic 109 of the CPU/Core 102.

In the retire stage, the results of one or more operations produced by the Execution Logic 109 are stored by the CPU/Core 102 as transient result operands for use by one or more other operations in subsequent issue/execute cycles.

The Execution Logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution/retire logic 109 is a connection fabric or interconnect network connected to the FUs so that data produced by a producer (source) FU can be passed to a consumer (sink) FU for further storage or operations. The FUs and the interconnect network of the execution/retire logic 109 are controlled by the executing program to accomplish the program aims.

Exemplary Embodiment of the Prediction Logic

Figure 8:
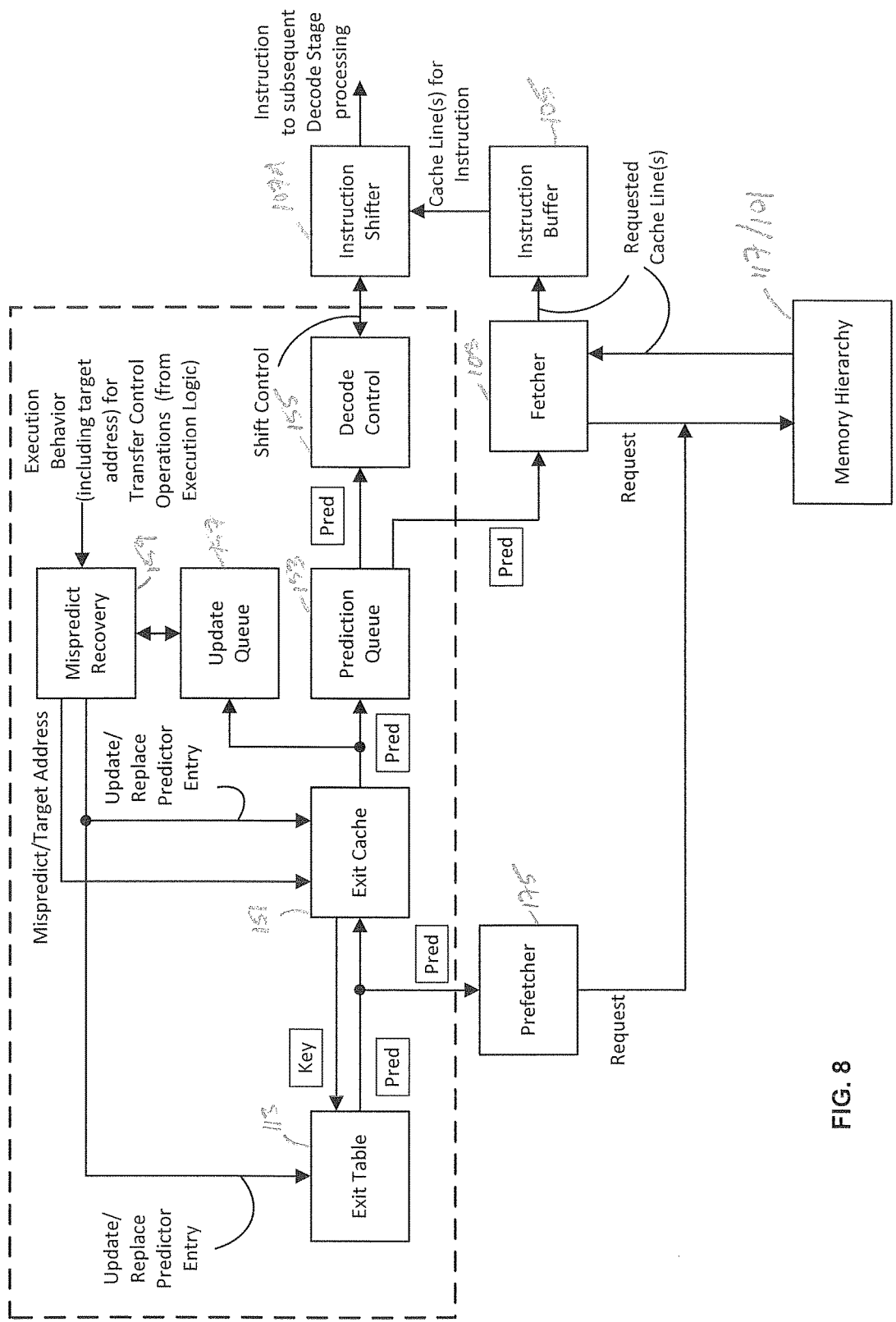
FIG. 8 is a schematic diagram illustrating an embodiment of the prediction logic of the computer processor of FIG. 6.

FIG. 8 shows an embodiment of the Prediction Logic 111 of the CPU of FIG. 6, including the Exit Table 113 and associated cache referred to as the Exit Cache 151. The Exit Table 113 and the Exit Cache 151 can be accessed to generate a chain of predictors that refer to consecutive EBB fragments of the program to be executed by the CPU 102. The chain of predictors is generated ahead of the Decode Stage 107 (a form of run-ahead prediction). The latency of accessing entries in the Exit Table 113 can be an issue in keeping up with the decoding operations of the Decode Stage 107, particularly where the Decode Stage 107 requires a prediction every cycle for the case in which every instruction can perform a control transfer operation. Such latency can be masked by storing the predictor entries read-out from the Exit Table 117 in the Exit Cache 151. In one embodiment, the Exit Cache 151 is a small hardware-based highly associative memory structure that holds recent predictor entries read-out from the Exit Table 113. Furthermore, the access latency of the Exit Cache 151 can be fast enough to read-out a matching predictor entry per cycle as needed.

The predictors read from the Exit Table 113 and stored in the Exit Cache 151 are supplied to a Prefetcher 175. Each predictor supplied to the Prefetcher 175 can include an address field that can be used to derive the target address for the starting cache line of a corresponding EBB fragment (or trigger access to the Return Stack to derive the return address for such starting cache line). Such predictor entry can also include a cache line count field that specifies the extent of the corresponding EBB fragment in memory by a number of cache lines. From the target address (or return address) and the cache line count, the Prefetcher 175 can be configured to derive the cache line address of every cache line of the corresponding EBB fragment. The Prefetcher 175 may be implemented to issue a separate prefetch request for each cache line of the EBB fragment, or the hierarchy may be implemented so that the entire contiguous group of cache lines of the EBB fragment can be requested with a single request, thereby reducing request traffic in the memory hierarchy.

The chain of predictors read-out from the Exit Cache 151 are output to a Prediction Queue 153 that feeds such predictors for processing by Decode Control Logic 155 for control of the decode operations performed by the Decode Stage 107 of the CPU 102. As the predictors are output to the Prediction Queue 153, a copy (or part) of each predictor is stored as an update record in the Update Queue 157. The update records stored in the Update Queue 157 are accessed by Mispredict Recovery Logic 159 that processes these update records in conjunction with execution behavior information reported by the Execution Logic 109. The execution behavior information permits an executed transfer operation to report to the Mispredict Recover Logic 159 what actually did happen and update future predictor entries to reflect that execution behavior. While the predictor entries provide an indication as to what is expected to happen, if the predictions defined by the predictor entries turns out to be wrong, it will be necessary to update the corresponding predictor entries in the Exit Table and Exit Cache with prediction information that reflects what actually did happen. Such an update may need to upgrade or downgrade the quality rating of the predictor entry or to replace the address field of the predictor entry. What actually happened will not be known until predicted instruction have been decoded and are executed and an executed control transfer operation either transfers control or does not transfer control as predicted. At that time, the Mispredict Recovery Logic 159 can be configured to locate the predictor entry in the Update Queue 157 that is either confirmed (or not confirmed) based on the execution behavior, and update the predictor entry accordingly. The updated predictor entry can then flow to the Exit Cache 151 and the Exit Table 113 where they are used to overwrite the corresponding predictor entries stored therein and used for subsequent processing.

The generation of the chain of predictors can start when the Mispredict Recovery Logic 159 detects that the execution behavior of the EBB fragments by the Execution Logic 109 has encountered a mispredict and raises a "mispredict"

signal that is supplied to the Exit Cache 151. The mispredict can be a taken mispredict where the Execution Logic 109 executes in fact an unexpected transfer out of a given EBB fragment, or the mispredict can be an untaken mispredict where the Execution Logic 109 unexpectedly does not transfer out of a given EBB fragment but instead falls through to the following instruction. In the case of a taken mispredict, the Execution Logic 109 will have computed the target address of the next EBB fragment as part of executing the control transfer operation that exits the given EBB fragment. That target address can be used to derive the new key for the chain of future predictions. In the case of an untaken mispredict, the new key is the alternate key for the previously expected transfer out of the given EBB fragment that wasn't taken.

Figure 9:
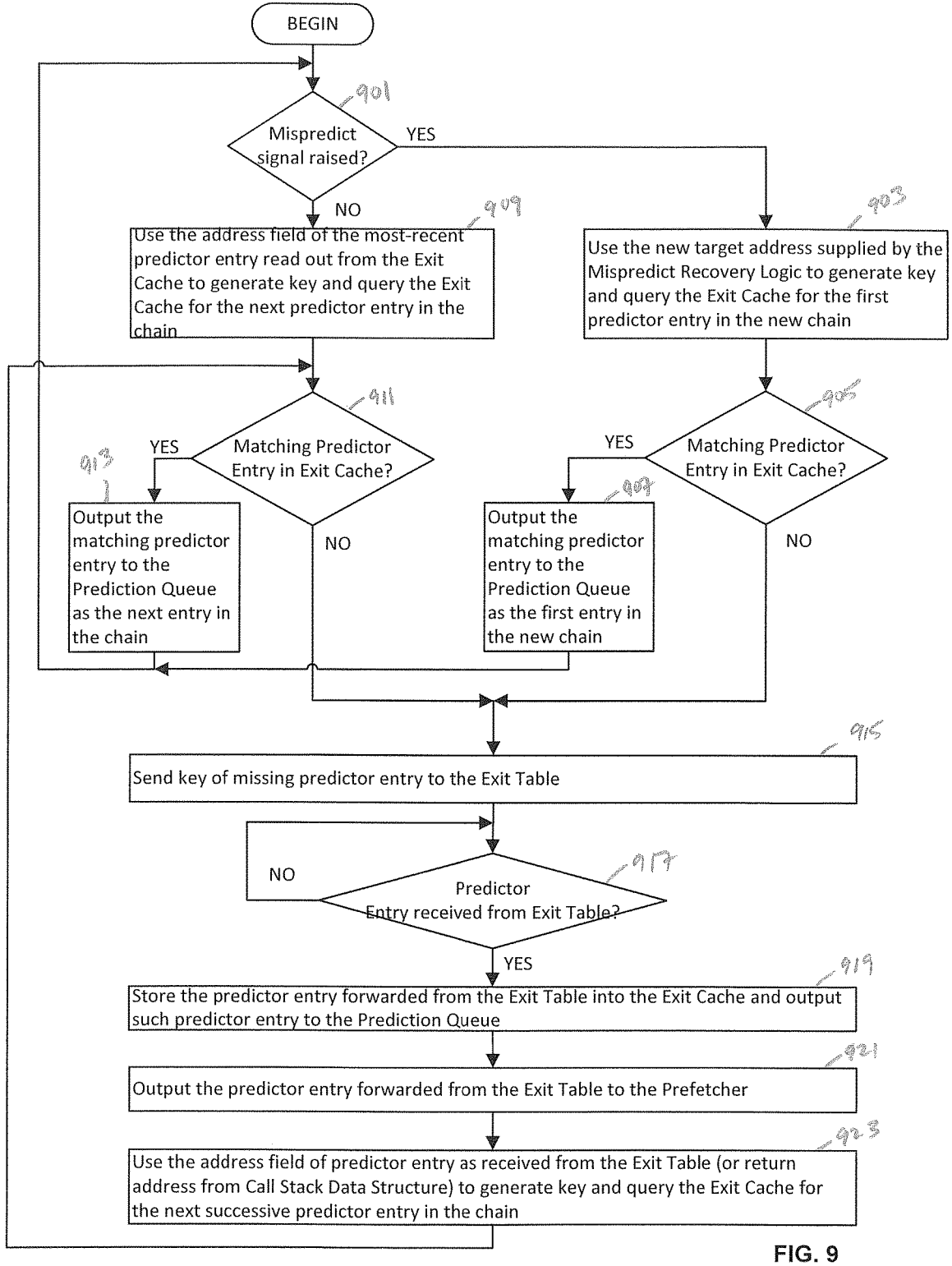
FIG. 9 is a flow chart illustrating exemplary operations carried out by the Exit Cache of FIG. 8 in generating chains of predictor entries for the control flow of an executing program according to the present disclosure.

As shown in the flow chart of FIG. 9, the Exit Cache 151 can be configured to cooperate with the Mispredict Recover Logic 159 and the Exit Table 113 in order to generate the chain of predictors as follows. In block 901, the Exit Cache 151 checks whether the Mispredict Recovery Logic 159 has raised the "mispredict" signal. If so (the "mispredict" signal is raised), the operations continue to block 903 where the new target address as supplied from the Mispredict Recover Logic 159 is used to generate a key that is used to query the Exit Cache 151, and the operations continue to block 905 to determine if a matching predictor entry has been found and read-out from the Exit Cache 151 as a result of the query of block 903. If so, in block 907, the matching predictor entry is output to the Prediction Queue 153 as the first predictor entry (the head predictor entry) in a new chain of predictors and the operations return to step 901 to generate the next entry in the chain (or start a new chain if a mispredict is signaled). If the matching entry is not found in block 905, the operations continue to block 915 below.

If the "mispredict" signal is not raised in block 901, the operations continue to block 909 where the address field of the most recent predictor read-out from the Exit Cache 151 is used to generate a key that is used to query the Exit Cache 151, and the operations continue to block 911 to determine if a matching predictor entry has been found and read-out from the Exit Cache 151 as a result of the query of block 909. If so, in block 913, the matching predictor entry is output to the Prediction Queue 153 as the next predictor in the chain and the operations return to step 901 to identify the following predictor in the chain (or start a new chain if a mispredict is signaled).

Figure 10:
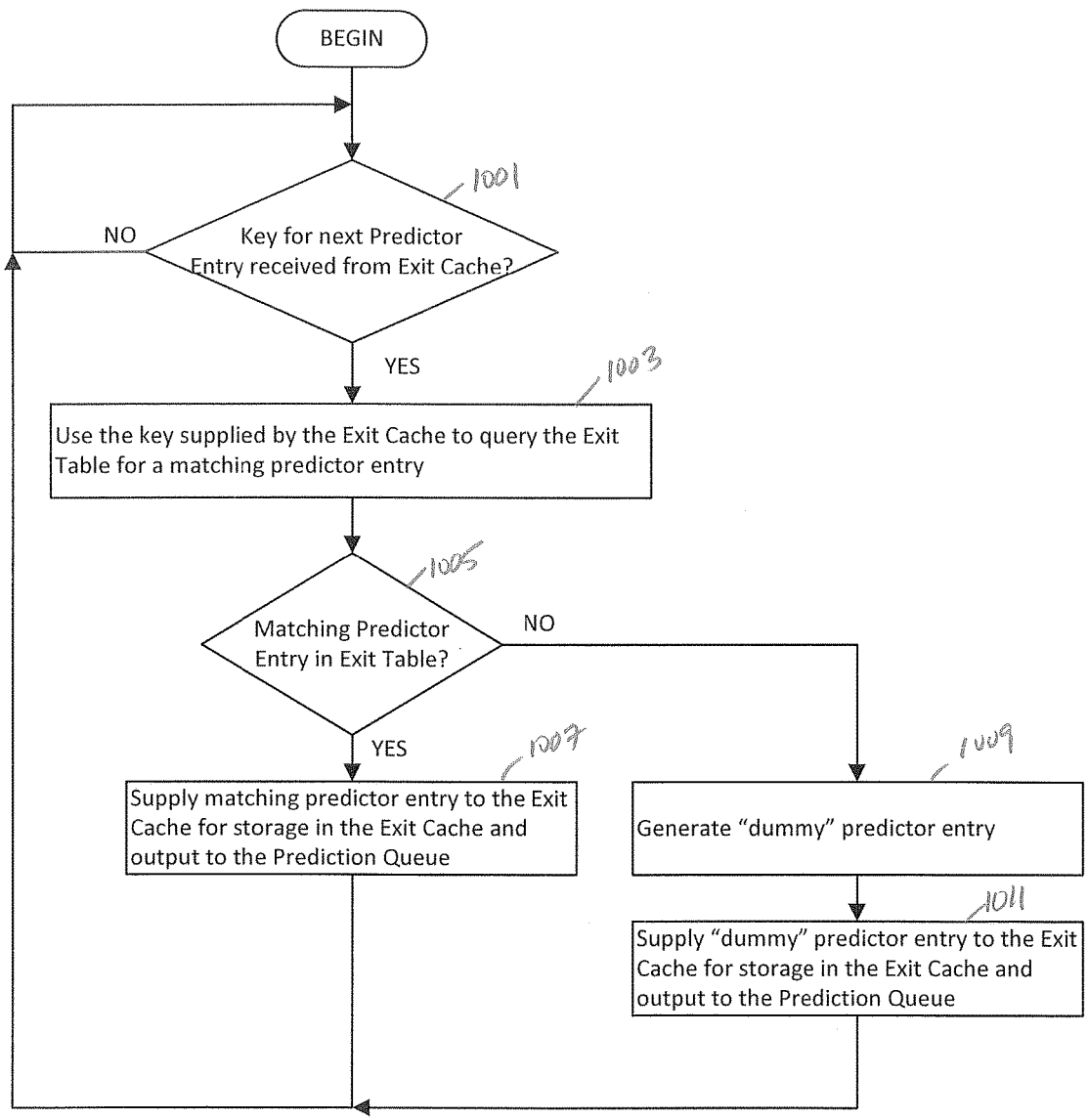
FIG. 10 is a flow chart illustrating exemplary operations carried out by the Exit Table of FIG. 8 in generating chains of predictor entries for the control flow of an executing program according to the present disclosure.

In block 915, the key of the missing predictor entry (that results from the query of block 905 or 911) is supplied to the Exit Table 113 for querying the Exit Table 113 as described with respect to the flow chart of FIG. 10.

In block 917, the Exit Cache is configured to wait for receipt of predictor entry corresponding to the key supplied in block 915. This can be a predictor entry whose key matches the key supplied in block 915 or possibly a "dummy" predictor entry if no matching predictor entry is found in the Exit Table 113.

In block 919, the predictor entry forwarded by the Exit Table 113 is stored in the Exit Cache 151 and also output to the Prediction Queue 153.

In block 921, the predictor entry forwarded by the Exit Table 113 is also forwarded to Prefetcher 175 in order to initiate prefetching operations with respect to the target EBB fragment corresponding to such predictor entry as described herein.

In block 923, the address field of the predictor entry forwarded by the Exit Table 113 is used to generate a key to query the Exit Cache 151, and the operations continue to block 911 to determine if a matching predictor entry has been found and read-out from the Exit Cache 151 as a result of the query of block 923.

Note the chaining process of the Exit Cache 151 (perhaps with the very first key) may be broken because the Exit Cache 151 does not store a matching predictor entry for the desired key. In this case, the key is presented to the Exit Table 113 and chaining continues therein.

The query operations of the Exit Table 113 is shown in the flow chart of FIG. 10. In block 1001, the Exit Table 113 waits for supply of a key for the missing predictor entry as supplied by the Exit Cache 151. In block 1003, the key for the missing predictor entry as supplied by the Exit Cache 151 is used to query the Exit Table 113 for a matching predictor entry and the operations continue to block 1005 to determine if a matching predictor entry has been found and read-out from the Exit Table 113 as a result of the query of block 1003. If so, in block 1007, the matching predictor entry is supplied to the Exit Cache 151 for storage and output to the Prediction Queue 153. If there is no matching entry found in block 1005 (in this case, there is no matching entry in both the Exit Table 113 and the Exit Cache 151), the operations continue to block 1009 where the Exit Table 113 generates a "dummy" predictor entry as described herein. In block 1011, the Exit Table 113 supplies the "dummy" predictor entry to the Exit Cache 151 for storage and output to the Prediction Queue 153.

The chain of predictors as generated by the Exit Cache 151 are stored in parallel by two queues, the Prediction Queue 153 and the Update Queue 157, both of which are hardware-based FIFO buffers that store a portion of the chain of predictor entries for the EBB fragments that are currently working their way to and through the Decode Stage 107. The Prediction Queue 153 and the Update Queue 157 advance in lock step as the predictor entries for the EBB fragments are processed in a FIFO manner as they work their way to and through the Decode Stage 107.

When a predictor entry with a fully resolved address is entered into the Prediction Queue 153, a copy of the predictor entry is also supplied to the Fetcher 103, which is configured to initiate memory requests that fetch the cache lines pointed to by the predictor entry from the cache of the Memory System 101 (or main memory if not already in cache) into the Instruction Buffer 105 of the CPU 102.

The predictor entries stored in the Prediction Queue 153 are supplied to Decode Control Logic 155 for control of the decode operations performed by the Decode Stage 107 of the CPU 102. More specifically, the Decode Stage 107 includes an Instruction Shifter 107A that operates to isolate instructions from instruction cache lines and passes on isolated instructions for detailed decode operations carried out by the Decode Stage 107. The Decode Control Logic 155 is configured to count the number of cache lines shifted by the Instruction Shifter 107A in processing the current predictor entry and the number of shifts the Instruction Shifter 107A has performed within each of these cache lines. It compares these counts against the predicted line count and instruction count of the current predictor entry (which corresponds to the EBB fragment that is being decoded by the Decode Stage 107). When the counts match, it moves to the next predictor entry in the chain (to effect a transfer to the next EBB fragment) and controls the Instruction Shifter 107A to begin shifting the cache lines corresponding to the next EBB fragment (i.e., the predicted target address (or return address) of the exiting EBB fragment). When transferring to the next EBB fragment, the operations can involve the following:

i) the Instruction Shifter 107A discarding any remaining part of the cache line being shifted;
ii) the Instruction Shifter 107A obtaining one or more cache lines corresponding to the next EBB fragment from the Instruction Buffer 105;
iii) the Decode Control Logic 155 discarding the current (now exhausted) predictor entry;
iv) the Decode Control Logic 155 cooperating with the Prediction Queue 153 to extract the next predictor entry of the chain from the head of the Prediction Queue 153 (i.e., advancing the FIFO Prediction Queue) and to transfer the next predictor entry to the Decode Control Logic 155; and
v) the Instruction Shifter 107A shifting instructions from the new cache line corresponding to the next EBB.

When a cache line is consumed by the Instruction Shifter 107A, it obtains the adjacent cache line from the Instruction Buffer 105. The count of the number of cache lines consumed by the Instruction Shifter 107A is incremented. When this count reaches the cache line count value specified by the current predictor entry, the count of the number of instructions shifted (or isolated) in the current cache line by the Instruction Shifter 107A is tracked. This is the last cache line of the EBB fragment. When that count value reaches the instruction count value specified by the current predictor entry, the address used for cache lines from the Instruction Buffer 105 is switched to the predicted target address (or return address) and shifting continues from the next EBB fragment in the chain.

It is quite common for EBB fragments to be only one (predicted) instruction long. So if the Decode Stage 107 is to be able to feed instructions for issue and execution at maximal rate, it is necessary for the Prediction Queue 153 and the Instruction Shifter 107A to be able to effect one transfer every cycle. However, except for tight loops, it is uncommon for there to be long sequences of one-instruction EBB fragments, so the buffering provided by the Prediction Queue 153 can be sufficient to hide the lower rate of occasional references that miss in the Exit Cache 151 and require access to the Exit Table 113. Tight loops (which involve a small number of EBB fragments) can fit in the Exit Cache 151, which can be configured to chain the predictor entries at a prediction-per-cycle rate that can keep up with the decode operations of the Decode Stage 107.

This general prediction flow from the Exit Cache 151 to the Prediction Queue 153 to the Decode Control Logic 155 is complicated by the presence of calls and returns. A call-type predictor entry points to a target EBB fragment, just like a branch-type predictor entry. However, a return-type predictor entry has a return address that will vary depending on the call site being returned to. In addition, because instructions may contain more than one call operation (which are executed one at a time), a return operation may need to re-execute part of the instruction that contained the call operation. The return address of the return operation, and how much if any remains to be executed in the calling instruction, can be part of a return state that is saved in a hardware-based stack data structure, which is referred to as the Return Stack herein. Such return state is saved in the Return Stack when a call-type predictor entry is transferred from the Prediction Queue 153 to the Decode Control Logic 155 or when an unpredicted call operation is executed by the Execution Logic 109.

When a return operation is predicted, it needs the corresponding call information to know the address(es) to return to. This return address can be obtained from the Return Stack. The return-type predictor entry can then be updated with the return address, and thereafter is treated the same as would be a branch-type predictor entry.

Details of Exemplary Prefetcher

In one embodiment, the Prefetcher 175 is a hardware unit that is configured to issue memory requests to the memory hierarchy of the CPU 102 that stores instructions. The memory requests that are issued by the Prefetcher 175 can be specially designated as prefetch requests, distinct from loads, stores, or other kinds of memory activity. Implementations can vary in their response to a prefetch request. In one embodiment, the prefetch request is treated as a request to hoist, i.e. copy the addressed cache line one level higher in the memory hierarchy of the CPU that stores instructions. In another embodiment, the prefetch request can be treated as a request to hoist the addressed cache line to the top (level one) instruction cache 117 in the memory hierarchy of the CPU. In both embodiments, the hoist has the effect of reducing the amount of time that would be required to get the addressed cache line to the decoder if it should happen that execution does in fact get as far as the predicted EBB without an intervening mispredict.

The predictor entry used to control the Prefetcher 175 can include an address field that can be used to derive the target address for the starting cache line of a corresponding EBB fragment (unless a return operation was predicted). Such predictor entry can also include a cache line count field that specifies the extent of the corresponding EBB fragment in memory by a number of cache lines. From the target address and the cache line count, the Prefetcher 175 can be configured to derive the cache line address of every cache line of the corresponding EBB fragment. These cache lines will be contiguous in memory if there is more than one. The Prefetcher 175 may be implemented to issue a separate prefetch request for each cache line of the EBB fragment, or the hierarchy may be implemented so that the entire contiguous group of cache lines of the EBB fragment can be requested with a single request, thereby reducing request traffic in the memory hierarchy.

Predictor entries corresponding to return operations as stored in the Exit Table 113 (and stored in the Exit Cache 151) and passed to the Prefetcher 175 can be processed in conjunction with a call stack data structure maintained by the Prefetcher 175 in order to derive the cache line address into the target EBB being returned to by the predicted return operation. Entries can be pushed on this call stack data structure whenever the Prefetcher 175 processes a call-type predictor entry. The branch-type and call-type predictor entries both include an address field that points to the entry address of the target EBB fragment. The Prefetcher 175 saves the cache line address for the entry address into the target EBB fragment. It also tallies the cumulative cache line counts within the current EBB that it has prefetched. The cache line address for the entry address into the target EBB fragment, adjusted by the cache line counts already prefetched, gives the cache line addresses of each succeeding EBB fragment. The Prefetcher 175 also tallies the count of untaken call operations within the caller EBB up to the point of the predicted taken call operation (as specified by the untaken call count fields for the predictor entry(ies) of the caller EBB) and thus tracks the EBB fragment number that will be returned to. The cache line addresses (along with the cumulative counts to that point) are pushed onto the call stack data structure when processing the predictor entries corresponding to call operations within the current EBB. When the Prefetcher 175 processes a return-type predictor entry, the Prefetcher 175 can be configured to pop the top entry of the call stack data structure to get a cache line address for the return point of the corresponding return operation, and uses this cache line address (possibly with an address offset represented by the address field of the return-type predictor entry) to derive a cache line address for the starting cache line of the next EBB fragment in the caller EBB. At the same time, the starting cache line address into the caller EBB and the fragment number determined from the untaken call counts can be used to generate a key to query the Exit Table 115 (and/or the Exit Cache 151) for the predictor entry associated with the returned-to EBB fragment. That predictor entry will give a cache line count field that specifies the extent of the next EBB fragment in the caller EBB by a number of cache lines. From the starting cache line address and this cache line count, the Prefetcher 175 can be configured to derive the cache line address of every cache line of the next EBB fragment in the caller EBB. These cache lines will be contiguous in memory if there is more than one. The Prefetcher 175 may be implemented to issue a separate prefetch request for each cache line of the next EBB fragment in the caller EBB, or the hierarchy may be implement so that the entire contiguous group of cache lines of the next EBB fragment in the caller EBB can be requested with a single request, thereby reducing request traffic in the memory hierarchy. The predictor entry associated with the returned-to EBB fragment can also be processed to generate the key for the next following predictor entry and the prefetching can continue down the chain of predictor entries.

In the presence of mispredicts, it is possible for the Prefetcher 175 to process return-type predictor entries for which it has not seen the corresponding call operation, thus causing the call stack data structure to underflow. In such a case, as there are no return addresses, the Prefetcher 175 cannot prefetch back into the caller EBB. However, as soon as chaining leads to a non-return prediction the Prefetcher 175 will again have an address (the target EBB entry) and can resume prefetching.

In addition, a long series of nested call operations can possibly overflow the limited hardware capacity of the call stack data structure. In such a case, the Prefetcher 175 can be configured to stop pushing return addresses as more predictor entries corresponding to call operations appear in the chain. Alternatively, the Prefetcher 175 can be configured to allow the call stack data structure to wrap around and continue pushing return addresses on top of previously pushed ones. The newly pushed return addresses are necessarily going to be returned to sooner than the older overwritten ones, and so are more likely to be still relevant when the calls start returning. Overwritten portions of the call stack data structure cannot be used to re-prefetch the return point and thereafter, so the Fetcher 103 (different from the Prefetcher 175 and described elsewhere) may have to obtain post-return lines from deeper in the hierarchy than if the Prefetcher 175 had a bigger call stack data structure. Subsequently, a mispredict can reset the operations of the Prefetcher 175, which will pick up from that point including subsequent call operations.

The predictor entries output from the Exit Table 113 can possibly be generated at a rate faster than the Prefetcher 175 can issue memory requests to the memory hierarchy of the CPU. However, it is not necessary for the Prefetcher 175 to store and process the predictor entries that it has not been able to keep up with. Instead the Prefetcher 175 can discard such predictor entries. In this case, the Prefetcher 175 can be configured to store the final key in a chain or predictor entries, and updating the chain of predictor entries as more predictions are added to the chain.

When the Prefetcher 175 has completed issuing prefetch requests for its current prediction, it can compare the target address of next EBB fragment to be prefetched with the saved last key of the chain of predictor entries. If the two match then the Prefetcher 175 has caught up with the chain of predictor entries output from the Exit Table. If they do not match, then the Prefetcher 175 can be configured to query the Exit Cache 151 (and possibly the Exit Table 113) with the target address as a key. The Exit Cache 151 will then return the next predictor entry in the chain, which the Prefetcher 175 will use for prefetch requests until it in turn is exhausted. The process continues until either the Prefetcher 175 catches up or the Exit Cache 151 is started on a new chain disjoint from the prior chain that was being prefetched.

This processing is designed such that the Prefetcher 175 does not overrun with respect to loops (and other possible code constructs) whose predictor entries make their way into the Exit Cache 151. For example, a chain of predictor entries that leads into a loop that is not in the Exit Cache 151 will follow the chain in the Exit Table 113, and the entries from the Exit Table 113 will be entered into the Exit Cache 151. The Prefetcher 175 will follow the same chain prefetching as it goes. Eventually the chain of predictors will lead back to the top of the loop, but the prediction for that EBB will have been placed in the Exit Cache 151 the first time chaining through the loop, and the Exit Cache 151 will stop requesting further chain entries of the Exit Table 113. The Prefetcher 175 is also stopped such that it does not follow the chain in the Exit Table around the loop over and over, flooding the memory hierarchy with pointless redundant prefetch requests.

A mispredict can start a new chain unless the correct target is found in the Exit Cache 151. Consequently if the sequence of keys being used to obtain predictor entries from the Exit Table 113 ceases to be linked by the successive target addresses it usually indicates that the former chain was being followed in error. Consequently there is no point to issuing any more prefetch requests for lines in that chain, whereas the new chain should represent the correct execution path and should be prefetched. Hence, when the Prefetcher 175 detects a break in the chain it abandons the chain it was prefetching and starts prefetching the predictions of the new chain.

The Prefetcher 175 can be configured to run arbitrarily far ahead of actual decode and execution. If it is way ahead on a chain that turns out to be down an incorrect execution path then it may have prefetched a large number of unneeded lines, which can lead to needless operations that scrub the instruction cache. To avoid such waste, the Prefetcher 175 can be configured track the quality ratings of the predictions of the chain as it goes and/or to derive a cumulative quality rating for the chain as a whole. This cumulative quality rating can be used to throttle the Prefetcher 175, such that it prefetches more lines and/or further down the chain when the cumulative rating is high than when it is low. A mispredict can be used to reset the cumulative quality rating to a neutral value.

Details of Exemplary Exit Cache

The Exit Cache 151 is a cache of the most recent predictor entries obtained from the Exit Table 113. The Exit Cache 151 can be designed such that it outputs a predictor entry at a rate of one per cycle and stores all the EBBs of most loops that do not contain calls. This permits the predictor entries to chain around most loops entirely from the Exit Cache 151, which saves latency and power compared to obtaining predictions direct from the Exit Table 113.

As explained elsewhere, certain predictor entries can have an associated alternate key that can be used for mispredict recovery. For example, the predictor entry for a closing (backward) branch operation of a loop can have an associated alternate key, reflecting the case when the loop exits rather than repeats again. When the Exit Cache 151 detects a loop (by detecting chaining to a request for a predictor entry that is already in the Exit Cache 151), then it no longer needs to load more predictor entries of the chain from the Exit Table 113 into the Exit Cache 151 as all of the EBB fragments of the loop are already in the Exit Cache 151. Instead, upon detecting a loop, the Exit Cache 151 can be configured to start chaining the execution path dictated by the alternate key. This follows the branch operation that closes the loop and thus triggers following a chain of predictors down the execution path that will be taken when the loop stops iterating. This alternate chain of predictors can be pre-loaded into the Exit Cache 151 upon detecting the loop, and thus can be used to fetch the corresponding EBB fragments of the alternate path into the Decode Stage 107 without waiting for such predictor entries to be read-out from the Exit Table 113. However, because the Exit Cache 151 is of limited size, the Exit Cache 151 must not load so many alternate-chain predictor entries that it overwrites some of the predictor entries of the loop itself. In this case, the Exit Cache 151 would need to reload such loop predictor entries from the Exit Table 113.

In one embodiment, the Exit Cache 151 can be formed by a ring buffer, with predictor entries from the Exit Table 113 placed into the ring buffer in sequential order with wrap-around. In this case, the predictor entries for a loop will be placed in the ring buffer in sequential order, starting with the EBB fragment at the top of the loop and ending with the EBB fragment at the bottom of the loop. When a loop is detected (by finding the next predictor entry in of the chain already in the ring buffer), then necessarily that predictor entry must be for the top of the loop and the earliest predictor entry in the ring buffer corresponds to the bottom of the loop. It is then possible to load the alternate chain predictor entries into the ring buffer (starting adjacent the predictor entry for the bottom of the loop) until an alternate chain predictor entry would overwrite the known predictor entry for the top of the loop, and then pause alternate path chain predictor loading at that point. It will be evident that other policies can have similar cautious alternate loading.

Details of Exemplary Prediction Queue and Update Queue

In one embodiment, the Exit Cache 151 outputs a chain of predictor entries to the Prediction Queue 153 and a corresponding chain of pending update records to the Update Queue 157 at a rate that the queues can accept them. The queues can be configured to throttle this rate so as to preclude queue overflow. The Exit Cache 151 can continue loading predictor entries from the Exit Table 113 if it has space, even though the Prediction and Update Queues are blocking the output of predictor entries/update records from the Exit Cache 151.

The Exit Cache 151 can be configured to construct an update record for each predictor entry output by the Exit Cache 151 to the Prediction Queue 153. The update records are stored by the Update Queue 157 and carry information that permits an executed transfer to report what actually did happen and update future predictor entries to reflect that experience. The update record can include the address field and quality information copied from a predictor entry output from the Exit Cache 151 and transferred into the Prediction Queue 153. The update records stored in the Update Queue 157 advance in a FIFO manner in step with the predictor entries stored in the Prediction Queue 153. Thus, if there is space in one there is space in the other.

The predictor entries stored in the Prediction Queue 153 are transferred to the Decode Control Logic 155 for control of the Instruction Shifter 107A as described herein. In conjunction with this processing, the Update Queue 157 constructs a partial prediction comprising the address field and quality information from the head pending update record. This partial prediction can be supplied to the Decode Stage 107 where it advances through the decode operations of the Decode Stage for the current EBB fragment. The partial prediction is exposed when the corresponding instruction, now fully decoded, is executed. If that instruction contains a taken transfer then the corresponding partial prediction can be augmented to a full prediction by adding the actual target address of the taken transfer (or the following address field in the caller if the transfer was a return operation) and the kind of transfer. The full prediction resulting from augmentation is in all respects what the original prediction should have been to successfully predict the transfer that actually happened. This prediction may then be used to update the corresponding original predictor entry in the Exit Table 113 and the Exit Cache 151.

When there is no predictor entry in the Exit Table 113 or the Exit Cache 151 for the next key of a chain of predictor entries, the Exit Cache 113 transfers a "dummy" predictor entry to the Prediction Queue 153. This "dummy" predictor entry can include a predefined "null" address field, a saturated cache line count and a saturated instruction count. The Decode Control Logic 155 can interpret the "dummy" predictor entry as a prediction for infinite cache lines and instructions so that the Instruction Shifter 107A will continue shifting until a mispredict occurs. The Exit Cache 151 also constructs a new update record that includes the key used in the unsuccessful search and default quality information. The default quality information can be set so that when a control transfer operation is executed and the new predictor entry is entered into the Exit Table 113 and Exit Cache 151, the new predictor entry will have the lowest possible quality rating. This policy reflects the expectation that newly executed code often has special control flow the very first time when executed, but thereafter follows a different pattern. While the new predictor entry will be used the next time the corresponding EBB fragment is entered, if it misses on that second execution then the minimal quality rating will cause the prediction to be immediately replaced with the new behavior without getting a second chance to predict successfully.

Note that update records stored in the Update Queue 157 need not contain the quality information of the original prediction. If it does not, then the augmented update record must always be sent to the Exit Table 113, where its key can be used to check the corresponding predictor entry's quality information and adjust or update the entry as appropriate. However, carrying the quality information in the update records of the Update Queue 157 permits optimizing this process, because whether adjustment or update is needed can be determined during the update process. Because most predictions are correct, augmentation will commonly find that it has a correct prediction that is already high quality, for which no adjustment is needed and the candidate update may be abandoned. This saves the power of the pointless query of the Exit Table 113.

It will be evident that other such optimizations are possible depending on experience policy. For example, a predictor entry with quality information indicating a high quality prediction may be changed to indicate a low quality prediction if it mispredicts, but will not be replaced. Consequently there is no need to place a full predictor entry in the Update Queue 157, nor to track the counts so as to construct an augmented prediction. A mispredict need only send a quality adjustment signal back to the Exit Cache 151 and Exit Table 113 and can save power by avoiding sending the full augmented prediction.

Details of Exemplary Fetcher, Instruction Buffer, Decode Control Logic and Instruction Shifter In the exemplary embodiment of FIG. 8, the Instruction Buffer 105 is operably disposed between the L1 Instruction Cache 117 and the Instruction Shifter 107A of the Decode Stage 107. The Instruction Buffer 105 operates as a small staging cache that buffers a stream of cache lines that have been predicted by the chain of predictor entries to be needed for decode and subsequent execution. The Fetcher 103 is a hardware unit that is configured to issue memory requests (load operations) that fetch this stream of cache lines from the memory hierarchy that stores instruction into the Instruction Buffer 105. The Fetcher 103 can maintain state about the fetch process for each predictor entry that it processes. The state can include the cache line address that it is fetching from, and a count of the cache lines to fetch starting at that address. Fetching continues, advancing the cache line address, until the count of cache lines have been fetched.

There can be special handling when the cache line count is saturated, i.e., it has the maximal value. In such a case, fetching continues indefinitely, with the Fetcher 103 and the Instruction Buffer 105 cooperating to keep the number of cache lines in the Instruction Buffer 105 between upper and lower thresholds set by a policy of the Fetcher 103. This is a form of blind fetching. Saturated cache line counts occur when the actual cache line count is too large to be represented in the fields used to hold the cache line count, or as part of "dummy" predictor value when there is no valid cache line count available. The Fetcher policy can be set to balance the need to keep the Instruction Shifter 107A supplied with cache lines without stalling against the waste of fetching cache lines that the Instruction Shifter 107A will never get to because of an intervening transfer. Blind fetching may also be limited by information about the total size of the current EBB as specified by the meta-data at the EBB entry point, as extended by subsequent explicit operations.

The Fetcher 103 can also maintain a fetch cursor in the Prediction Queue 153, which points to a particular predictor entry stored in the Prediction Queue 153. When the Fetcher 103 completes storing the cache lines for the predictor entry pointed to by the fetch cursor in the Instruction Buffer 105, it sets its cache line address to the target address of the predictor entry pointed to by the fetch cursor, advances the fetch cursor such that it points to the next predictor entry the Prediction Queue 153, and sets the cache line count to the cache line count value of the next predictor entry. Note that the cache line address is not set to the target address (or return address) of the new predictor entry but to the target address (or return address) of the just-completed predictor entry. The Fetcher 103 can resume fetching cache lines according to its new state.

Branch-type predictor entries, call-type predictor entries and Return-type predictor entries with a resolved return address contain an address field and cache line count that can be processed by the Fetcher 103 to derive the cache line addresses of the cache lines of the current EBB fragment. The Fetcher 103 can be configured to pause the fetching operations in any of three circumstances:

i) when it has completed fetching operations for the last predictor entry in the Prediction Queue 153 and must wait for another from the Exit Cache 151;

ii) when the Instruction Buffer 105 is full of lines that have not yet been consumed by the Instruction Shifter 107A and the Fetcher 103 must wait for the Instruction Shifter 107A to consume a cache line and free up space in the Instruction Buffer 105; or iii) when the next predictor entry corresponds to a return operation with an unresolved return address.

In the last case, the Fetcher 103 can be configured to access the Return Stack in order to obtain a return address to know which cache lines to request for fetching. The use of the Return Stack by the Fetcher 103 is similar to the use of the call stack data structure by the Prefetcher 175. There is one significant difference between the addresses stored by the Return Stack as compared to the call stack data structure. Specifically, the addresses stored in the Return Stack and used by the Fetcher 103 are code byte addresses as needed by the Instruction Shifter 107A. In contrast, the addresses stored in the call stack data structure and used by the Prefetcher 175 are cache line addresses as determined by the EBB entry address as modified by the line counts of subsequent fragments in the same EBB. The Fetcher 103 itself needs only cache line addresses, like the Prefetcher 175, but true byte addresses are needed by the Instruction Shifter 107A in order to locate and isolate the start of an instruction within a cache line. Because it is easy to determine a cache line address from a given byte address, it is convenient for the Return Stack to store the return addresses as true byte addresses that can be used by both the Fetcher 103 and the Instruction Shifter 107A.

When processing a predictor entry that corresponds to a return operation with an unresolved return address, there are two possibilities: the corresponding call operation has already been shifted by the Instruction Shifter 107A and the return address is on the Return Stack; or the corresponding call operation is predicted by a predictor entry that is stored in the Prediction Queue 153 and has not yet been consumed by the Instruction Shifter 107A. In order to address these possibilities, the state information maintained by the Fetcher 103 can include a count of the net number of predictor entries corresponding to the call operations that it has processed, incrementing this count with the processing of each call-type predictor entry and decrementing this count with the processing of each return-type predictor entry. Similarly, the Decode Control Logic 155 can be configured to maintain a similar count of the net number of call-type predictor entries that it has processed. If these counts are equal then the Instruction Shifter 107A has already shifted the call operation corresponding to the Fetcher's return-type predictor entry, and the required return address is on the top of the Return Stack. If such count as maintained by the Fetcher 103 is larger than the corresponding count maintained by the Decode Control Logic 155, then there must be a call-type predictor entry stored in the Prediction Queue 153, and the Fetcher 103 can be configured to wait for the Decode Control Logic 155 to process this call-type predictor entry. If such count as maintained by the Fetcher 103 is less than the corresponding count maintained by the Decode Control Logic 155, then the return address corresponding to the Fetcher's return-type predictor entry is in the Return Stack at a distance down from the top equal to the difference between Decode Control Logic and Fetcher counts. Once the Fetcher 103 is able to obtain the return address from the Return Stack, it can use that return address to initiate the fetch process for the cache lines at the return address. In addition, the Fetcher 103 can resolve the return-type predictor entry by updating the address field of the predictor entry with the correct return address, as if the prediction were for a branch (for which the key supplies the target address). Eventually the resolved return-type predictor entry will reach the Decode Control Logic 155, which will use the updated target address to obtain cache lines from the Instruction Buffer 105 where the fetch operations had placed them.

In processing a predictor entry, the Fetcher 103 requests that one or more cache lines be brought from the L1 Instruction Cache 117 (or from elsewhere in the Memory System 101) into the Instruction Buffer 105. The Instruction Buffer 105 and the Fetcher 103 are configured to avoid overwriting any cache lines that have not yet been consumed by the Instruction Shifter 107A (but will be consumed in the future). The Instruction Buffer 105 can also be configured to deal with the situation in which a single predictor entry points to more cache lines than can be stored in the Instruction Buffer 105, in which case it can be configured to act like a streaming buffer between the Instruction Shifter 107A and the L1 Instruction Cache 117.

The Fetcher 103 can also be configured to check the Instruction Buffer 105 before sending a memory request to the memory hierarchy that stores instructions. If the requested cache line is already in the Instruction Buffer 105, then the Fetcher 103 has detected a loop that fits in the Instruction Buffer 105. The Fetcher 103 can then cease issuing additional memory requests, which would be redundant to the cache lines already in the Instruction Buffer 105, until the loop exits, typically by a mispredict unless the loop itself was predicted as described elsewhere.

A predictor entry can be output from the Prediction Queue 153 to the Decode Control Logic 155 when the Instruction Shifter 107A completes shifting the predicted last instruction from the current EBB fragment. Depending on the implementation, the Decode Control Logic 155 may also access the address field (target address or return address) of the predictor entry at the head of the Prediction Queue 153 even before the Instruction Shifter 107A completes shifting the current EBB fragment. That address field (target address or return address) indicates the next cache line to use after the last cache line of the current EBB fragment. By accessing the Prediction Queue 153 early, the Decode Control Logic 155 may be able to get a few cycles head start on requesting that cache line from the Instruction Buffer 105 for supply to the Instruction Shifter 107A. This can be important when the first instruction of an EBB crosses a cache line boundary and the Instruction Shifter 107A needs two full new cache lines before it can begin shifting.

The Fetcher 103 runs ahead of the Decode Control Logic 155 in processing the predictor entries read-out from the Prediction Queue 153. Working from the most recent toward the most future predictor entries in the Prediction Queue 153, it issues memory requests to fetch cache lines from the memory hierarchy into the Instruction Buffer 105 where the Instruction Shifter 107A can find them when it catches up. To issue these requests, the Fetcher 103 can derive the target address of the target EBB fragment and the cache line count, both of which are available from the predictor entry in the predictor queue (expect for return-type predictor entries).

For return-type predictor entries, the predictor entry can contain an address field pointing to the offset of the next EBB fragment after the call site. Unlike the address fields that are part of branch-type and call-type predictor entries, this address field does not represent a target address but it used by the Fetcher 103 in conjunction with the Return Stack data to derive the cache line address for the next EBB fragment as described herein. Note that such cache line address, while suitable for fetching, is not a byte address as needed by the Decode Control Logic 155 in controlling the Instruction Shifter 107A. While the cache line count and instruction count of the preceding call-type predictor entry are known, the byte address of the subsequent return operation is unknown until the corresponding call operation is consumed by the Instruction Shifter 107A. The Decode Control Logic 155 knows that the exit point of the current EBB fragment is a call operation when the predictor entry for the current EBB fragment is a call-type predictor entry (i.e., either an inner-call or outer-call kind of predictor). If the predictor kind is an inner-call type, then the return address of the return operation is the address of the instruction that included the corresponding call operation. If the predictor kind is an outer-call type, then the return address of the return operation is the address of the next instruction following the instruction that included the corresponding call operation. In either case, the Decode Control Logic 155 computes the return address in order to control the shifting performed by the Instruction Shifter 107A. Furthermore, the return address as computed by the Decode Control Logic 155 is saved in the Return Stack and used by the Fetcher 103 to update return-type predictions in the Prediction Queue 153 so that the cache lines after the return point can be fetched into the Instruction Buffer 105 for processing by the Decode Control Logic 155 in controlling the Instruction Shifter 107A.

It is of course possible for the Fetcher 103, running ahead of the Decode Control Logic 155 in processing the predictor entries stored in the Prediction Queue 153, to process a return-type prediction before the Decode Control Logic 155 has processed the call-type predictor entry that enters the EBB of such return-type predictor. If this happens the Fetcher 103 can be configured to stall and wait for the Decode Control Logic 155 to process the corresponding call-type predictor entry. If the called function is very brief, the Instruction Shifter 107A may need to stall until the cache lines for the return point arrive at the Instruction Buffer 105. In this case, the Fetcher 103 can continue working up the Prediction Queue 153 issuing requests even with the Instruction Shifter 107A stalled, at least until it processes another unresolved return-type prediction.

The stalling of the Fetcher 103 can be avoided in some cases if the Prefetcher 175 annotates return-type predictions with the cache line addresses that it uses for post-return prefetches, or equivalently with the cumulative line counts that can be used to compute those line addresses. However, the Prefetcher 175 might not be able to prefetch through all return-type predictions so some return-type predictor entries in the Prediction Queue 153 can possibly lack cache line addresses, forcing the Fetcher 103 to stall until the corresponding call operation is processed by the Decode Control Logic 155 as described above.

In the presence of mispredicts, it is possible for the chain of predictor entries stored in the Prediction Queue 153 to include one or more return-type predictor entries that did not have corresponding call-type predictors earlier in the chain. In such a case, the count of the net number of call-type predictor entries as maintained by the Fetcher 103 and the Decode Control Logic 155 will never become equal, a return-type predictor will never be resolved, and the Fetcher 103 will stall when processing the unresolved return-type predictor. Eventually the Decode Control Logic 155 will catch up and process the unresolved return-type predictor entry. At that point the corresponding call must be on top of the Return Stack. Consequently the two counts can simply be set equal, the return-type predictor entry can be updated with the return address normally, the Fetcher 103 can be released to fetch the cache lines of the return-type predictor entry and continue working up the Prediction Queue 153, and the Decode Control Logic 155 can control the Instruction Shifter 107A to obtain the cache line containing the return address from the Instruction Buffer 105.

The Fetcher 103 can be configured to avoid issuing fetch requests that might cause the Instruction Buffer 105 to overflow. A simple way to avoid such overflow is to maintain a count of the number of free spaces in the Instruction Buffer 105, incremented when a cache line is obtained by the Instruction Shifter 107A and decremented when the Fetcher 103 issues a fetch request. A somewhat more complex strategy can take advantage of the expected latency of fetch requests and the expected number of cache lines obtained by the Instruction Shifter 107A in that interval. The Fetcher 103 can then run ahead of actual capacity in the expectation that capacity will be available when the cache lines actually arrive in the Instruction Buffer 105. Such an approach potentially is more economical of space in the Instruction Buffer 105, but must deal with occasional overflows and re-fetches.

Fetch requests can miss in the cache hierarchy if they would fault or trigger paging. Such an event can be configured to stall the operation of the Fetcher 103 under the assumption that the prediction leading to the event is a mispredict.

As described herein, the Instruction Shifter 107A operates under control of the Decode Control Logic 155 to isolate instructions from cache lines obtained from the Instruction Buffer 105 and pass the isolated instructions to subsequent sub-stages of the Decode Stage 107. In one embodiment, the Instruction Shifter 107A can be configured to isolate one instruction per machine cycle, and the instructions are not longer than a cache line. In this case, the Instruction Shifter 107A needs to shift at most two concatenated cache lines to isolate an instruction. The shift count that is used to isolate a given instruction can be derived from a field at a fixed position in every instruction. The Decode Control Logic 155 can be configured to maintain state to indicate how far it has gotten in the current EBB fragment that it is working on. Such state information can include one or more of the following:

i) the address of the next instruction to be shifted;
ii) the key of the current EBB fragment;
iii) a count of the number of cache lines that have been obtained by the Instruction Shifter 107A from the Instruction Buffer 105, and
iv) a count of the number of instructions that have been isolated from the most recently obtained cache line.

The isolated instructions can be annotated with this state as of when they were isolated. The instructions can retain this annotation as they pass through subsequent subs-stages of the Decode Stage 107 and follow on issue and execution. Such annotation can be used for mispredict recovery as described elsewhere.

In normal operation, the Decode Control Logic 155 utilizes the predictor entry obtained from the head of the Prediction Queue 153 to guide the shifting operations of the Instruction Shifter 107A. When it starts work on a predictor entry, the Decode Control Logic 155 saves the cache line count and instruction count of the predictor entry into local state and controls the Instruction Shifter 107A to obtain the cache line of the predicted target address and (usually) a second cache line from the Instruction Buffer 105. The second cache line can be omitted when the predictor entry indicates that the EBB fragment will be exited by an instruction wholly contained in the first cache line. Each time the Instruction Shifter 107A isolates an instruction, the instruction counter of the state information maintained by the Decode Control Logic 155 is incremented. Each time the Instruction Shifter 107A requests (or obtains) a cache line from the Instruction Buffer 105, the cache line counter of the state information maintained by the Decode Control Logic 155 is incremented and the instruction counter is zeroed. When the cache line counter and the instruction counter of the state information as maintained by the Decode Control Logic 155 equals to the cache line count and instruction count of the current predictor entry, then the current predictor entry has been fully shifted and the Decode Control Logic 155 can obtain the next predictor entry from the head of the Prediction Queue 153 and then repeat the process.

The Decode Control Logic 155 can be configured to carry out special behavior when both the cache line count and the instruction count of the current predictor entry are saturated, i.e. have maximal values. In the case of a saturated cache line count not accompanied by a saturated instruction count, the Decode Control Logic 155 can treat the predictor entry as a normal prediction and the saturated line count as an exact cache line count. In the case of a saturated instruction count that is not accompanied by a saturated cache line count, the Decode Control Logic 155 can be configured to isolate all instructions of the last cache line of the corresponding EBB fragment that do not run over into the following cache line. In the case that both the cache line count and the instruction count of the current predictor entry are saturated, the Decode Control Logic 155 can be configured to control the Instruction Shifter 107A to continue obtaining cache lines from the Instruction Buffer 105 and isolating the instructions from the obtained cache lines indefinitely until stopped by a mispredict. As described herein, the saturated cache line count and the saturated instruction count can be used when the actual cache line count or the instruction count exceeds the capacity of the predictor fields used to store them. Saturation of both counts is also used in dummy predictions used when no prediction is available, such as after a mispredict.

If the Prediction Logic 111 is working well, then the Instruction Shifter 107A will obtain an uninterrupted stream of cache lines from which it will isolate an uninterrupted stream of instructions. However, if the Instruction Buffer 105 has fallen behind the Instruction Shifter 107A, then the Instruction Buffer 105 might not have the next cache line at hand and is waiting for it to arrive from the memory hierarchy. When this happen, the Instruction Shifter 107A can be configured to stall, introducing a bubble into the Decode Stage 107. When the desired cache line arrives in the Instruction Buffer 105, it can be obtained by the Instruction Shifter 107A for shifting, but the bubble can remain in the later stages of decoding. Under some circumstances this bubble can be squeezed out, most commonly by issue cycles that contain an elided no-op, but in general the bubble will reach the final sub-stage of the Decode Stage 107 and would issue as if it were an instruction and not a bubble. The issue stage of the CPU can be configured to recognize the presence of the bubble and stall issue until eventually a valid decoded instruction reaches the issue stage, whereupon execution resumes.

The Instruction Buffer 105 may fail to provide a cache line for other reasons than delay in the memory hierarchy. For example, a fetch request can cause a fault, perhaps because of a protection violation, or can trigger paging. In this case, the Fetcher 103 can be configured to return a "dummy" cache line to the Instruction Buffer 105. The "dummy" cache line can be marked with the nature of the problem. When the Instruction Shifter 107A attempts to shift the "dummy" cache line, the Instruction Shifter 107A can be configured to not shift but instead produce a "dummy" instruction with the same marking. This "dummy" instruction can works its way through the Decode Stage 107 until it reaches the issue stage, which cannot issue because it does not have a real instruction. Instead the attempted issue of the "dummy" instruction can trigger an untaken mispredict, as if a transfer had been predicted for the prior cycle but did not happen. As described herein, this mispredict will restart the Fetcher 103 and the Instruction Shifter 107A with the fall-through address (where the "dummy" instruction would have been) as the target address. The first fetch request after a mispredict will not ignore faults and paging, so whatever had been the problem with the cache line before will this time cause the machine to take notice and take a fault or paging trap.

Return Stack

As described herein, the Return Stack stores addresses corresponding to call operations in order to provide address information when returning from such call operations. Note that such call operations have not necessarily been executed yet as the instruction containing a call operation might still be in flight in the Decode Stage 107. Consequently, the stack information that a return-type predictor entry will need must be saved by the prediction of a call operation, not by the execution of a call operation. This information is saved onto the Return Stack. Note that while the cache line count and instruction count of a call-type predictor entry are known, the byte address of the subsequent return operation is unknown until the corresponding call operation is consumed by the Instruction Shifter 107A. The Decode Control Logic 155 knows that the exit point of the current EBB fragment is a call operation when the predictor entry for the current EBB fragment is a call-type predictor entry (i.e., either an inner-call or outer-call kind of predictor). If the predictor kind is an inner-call type, then the return address of the return operation is the address of the instruction that included the corresponding call operation. If the predictor kind is an outer-call type, then the return address of the return operation is the address of the next instruction following the instruction that included the corresponding call operation. In either case, the Decode Control Logic 155 computes the return address in order to control the shifting performed by the Instruction Shifter 107A. Furthermore, the return address as computed by the Decode Control Logic 155 is saved to the Return Stack.

In one embodiment, the Return Stack is a LIFO data structure that logically overlaps the execution call stack. The Return Stack size logically is the size of the call stack (all functions that have been entered but not yet exited by the program), plus an extension that is bounded by the cycle depth of the Decode Stage 107. The extension is needed because that is the maximum number of machine cycles that might occur between the processing of call-type predictor entries by the Decode Control Logic 155 and call execution (which would have left an activation frame for the call with the return information on the call stack). Each one of these machine cycles might possibly contain a call operation that needs its information saved as part of the Return Stack. Logically, the extension extends the call stack into the future by a few machine cycles. Once a call operation (whose information was placed into the extension by the Decode Control Logic 155) is executed, then the return address information is also on the call stack, and the return address information for the call operation stored as part of the extension can be discarded. Thus the call stack and the extension together logically define the Return Stack.

The Fetcher 103 can be configured to query the Return Stack to resolve return-type predictor entries and update them with the correct return address. The depth of the query is the number of in-flight call-type predictor entries that could have been seen by the Fetcher 103 but not yet by the Decode Control Logic 155. The maximal value of this difference is equal to the length of the Prediction Queue 153, and occurs when the entire queue is full of return-type predictor entries and the Fetcher 103 has reached the final one. This is a relatively small number, albeit larger than the number of stages between the Instruction Shifter 107A and issue. Consequently, while the Return Stack can be implemented as comprising the call stack and an extension as described, it can also be implemented as a structure entirely separate from the call stack, which is likely to be a simpler implementation as it avoids queries into the call stack.

In the event of a mispredict the call-stack-and-extension implementation of the Return Stack discards any entries in the extension. These entries would reflect call-type predictor entries in the Prediction Queue 153, of which there are none because the Prediction Queue 153 is emptied at a mispredict. In the event of a mispredict in the separate implementation of the Return Stack, only those Return Stack entries that reflect call-type predictor entries that were in the Prediction Queue 153 should be discarded. Those that reflect actually executed calls whose frames are still in the call stack must be retained.

The Return Stack can be configured such that it keeps up with the peak prediction entry processing rate (e.g., one predictor entry per machine cycle) of the Prediction Queue 153, Fetcher 103, Decode Control Logic 155 and Instruction Shifter 107A.

Mispredict Recovery

Mispredicts can have two forms:
i) a taken mispredict, in which an executed conditional transfer operation (predicted as not-taken) unexpectedly caused a transfer; and
ii) an untaken mispredicts, in which an executed conditional transfer operation (predicted as taken) unexpectedly did not cause a transfer.

Unconditional transfers cannot mispredict. These two kinds of mispredicts require different handling.

In the event of a taken mispredict, the Decode Control Logic 155 has no corresponding predictor entry to work from and the chain of predictions that had been feeding it are useless. In this case, the Mispredict Recovery Logic 159 can be configured to discard the internal state of the Decode Stage 107 and unwind any instructions that have been issued down the wrong path. The Prediction Queue 153 is emptied, as is the part of the Return Stack that reflects calls in flight in the Decode Stage 107. Furthermore, entries reflecting actually executed calls are left intact. The state information (cache line counter and instruction counter) maintained by the Decode Control Logic 155 is cleared. The current instruction address and the key for the current EBB fragment is set to the target address of the taken mispredicted operation, which is stored in the program counter 115. The Decode Control Logic 155 is supplied with a "dummy" predictor entry, which has a predefined "null" target address and a "null" kind and has saturated cache line count and a saturated instruction count. Such "dummy" predictor entry causes the Decode Control Logic 155 to control the Instruction Shifter 107A to continue obtaining cache lines from the Instruction Buffer 105 and isolating instructions from the obtained cache lines indefinitely until a mispredict occurs. Furthermore, the contents of the Instruction Buffer 105 can be left intact, but may be overwritten by future fetches. If possible, outstanding fetches that have not yet reached the Instruction Buffer 105 may be quashed, or alternatively the fetches may be permitted to complete to the Instruction Buffer 105. The state information of the Fetcher 103 is cleared, and the fetch cache line address is set to the cache line containing the target address of the taken mispredicted. The cache line count is also set to the saturated value, which causes the Fetcher 103 to continue to fetch lines indefinitely, cooperating with the Instruction Buffer 105 to keep the number of cache lines awaiting the Instruction Shifter 107A between high- and low-thresholds set by the policy of the Fetcher. This is the same behavior as is used when there is a valid prediction that has overflowed the cache line count.

Furthermore, the Mispredict Recovery Logic 159 can supply the new key (the target address of the taken mispredicted operation) to the Exit Cache 151 to find a prediction for the new EBB fragment. This stops the chain currently being followed by the Exit Cache 151 (and possibly by the Prefetcher 175, Prediction Queue 153, Fetcher 103 and the Decode Control Logic 155 if such predictor entries were active). If the Exit Cache 151 has no matching predictor entries for the new key, then the Exit Table 113 will be queried with the new key. If no prediction is found in either place, then the Exit Cache 151 will transfer a "dummy" predictor entry to the Prediction Queue 153, which is passed to the Fetcher 103 and the Decode Control Logic 155 for processing. The processing of the "dummy" predictor entry by the Decode Control Logic 155 will control the Instruction Shifter to shift indefinitely until the next mispredict. Note that the Decode Control Logic 155 does not count down the counts for the "dummy" predictor entry similar to a regular predictor entry. Instead, the count values remain saturated regardless of the number of instructions shifted. Consequently shifting after the taken mispredict can shift more cache lines or instructions than are representable in a predictor entry. This is the same behavior as for regular predictions that overflow the representation of counts in a predictor entry.

If a predictor entry is found that matches the new key in either the Exit Cache 151 or Exit Table 113, then that predictor entry starts a new chain, which is entered into the Exit Cache 151 if from the Exit Table 113. The new chain is forwarded to the Prediction Queue 153, which was emptied when the taken mispredict was encountered. If the new chain includes a return-type predictor entry, it can be resolved normally and updated with the return address from the Return Stack. The new predictor chain replaces the "dummy" predictor entry that had been given to the Fetcher 103 and the Decode Control Logic 155 when the taken mispredict was encountered.

The time required before the Decode Control Logic 155 can start the Instruction Shifter 107A using the new chain after a taken mispredict depends on how long it takes the Fetcher 103 to obtain the cache lines containing the target address of the taken mispredicted operation. This time can be highly variable. It can happen that cache lines and instructions shifted under control of the "dummy" predictor entry overlap the cache lines and instructions called for in the new chain. In this case, the processing of the new chain in Decode Control Logic 155 can continue shifting as if there had been no taken mispredict at all. However, it can also happen that the Instruction Shifter 107A has overrun beyond the number of cache lines and instructions called for in the new chain. In fact, a second taken mispredict can be detected. When a second taken mispredict is detected, then the entire above sequence will be repeated, with a second "dummy" predictor entry. In this case, the prediction mechanism can be configured to ensure that an in-flight predictor entry does not replace the wrong "dummy" predictor entry. This can be accomplished by associating a sequence number to each "dummy" predictor entry along with the request for a new chain and the corresponding predictor entry. The predictor entry can be used to replace a "dummy" predictor matching in the Decode Control Logic 155 only when sequence number of the predictor entry matches the sequence number of the "dummy" predictor entry that is currently being processed by the Decode Control Logic 155.

In addition, when a taken mispredict is detected, the Mispredict Recovery Logic 159 can also be configured to attempt to improve the quality of the predictor entries stored by the Exit Table 113 and the Exit Cache 151 such that the taken mispredict is less likely to occur should the corresponding EBB fragment be executed again later. In this case, the Mispredict Recovery Logic 159 can construct a new predictor entry that reflects what the failing prediction should have been but wasn't, using information from the Update Queue 157 that annotated the instruction that caused the taken mispredict. In the new predictor entry, the next-key (target address) is the computed address of the unexpected taken operation and its kind is the kind of transfer actually taken; both are available from the hardware operation that executed the transfer. In addition, the new predictor entry can contain what should have been the cache line count and instruction count for the EBB fragment whose predicted exit failed. Note that these are the counts and key of the EBB fragment that the unexpected transfer was from, not of the EBB fragment that the unexpected transfer was to. Both the cache line count and the instruction count as well as the key are known to the Decode Control Logic 155 as it worked on the EBB fragment whose predicted exit failed. The key of the new predictor entry can be derived from the entry address of the target EBB of the taken mispredicted operation, while the cache line count and the instruction count can be derived from the counts computed during operation of the Instruction Shifter 107A as it processed the EBB fragment that the unexpected transfer was from. Note that the key and counts of the new predictor entry are based on the operation of the Instruction Shifter 107A at shift time, while the taken mispredict is detected (and the new prediction must be created) at execution time, several cycles later. Thus, the Mispredict Recovery Logic 159 cannot use the then-current key and counts because they are out of date with respect to the actually failing operation. Instead, the Instruction Shifter 107A can be configured to annotate each instruction it produces with information that says "if this instruction causes a taken mispredict, then here is its key and what the counts should have been to have made this instruction be a predicted exit." This annotation remains attached to the instruction and its operations as it works its way through the Decode Stage 107 to issue and execution, and is available to the transfer operation that executes the unexpected transfer, which triggers a taken mispredict and constructs the new predictor entry as described herein.

The new predictor entry (including its key) can be supplied to the Exit Table 113. The Exit Table 113 uses the key of the new predictor entry to update its quality information for the prediction at that key. If there is no prediction for that key (as detected by the check bits in the Exit Table 113), then the new predictor entry is simply inserted into the Exit Table 113 with initial quality information set by table policy. If a predictor entry for the key does exist in the Exit Table 113, its quality information is adjusted downward because it had led to a mispredict. If such downward adjustment causes the quality information to fall below a policy-set threshold, then the previous predictor entry for that key is replaced by the new predictor key. The Exit Cache 151 is also notified to update or replace its predictor entry for that key if it has one. This update mechanism lets predictions track program behavior as it changes over time during execution.

The Mispredict Recovery Logic 159 can also be configured to update predictor entries stored in the Exit Table 113 based on the new predictor entry. In this case, the Mispredict Recovery Logic 159 can apply the update policy itself, choosing to send only an update to the quality rating of the appropriate predictor entry or to send the entire new predictor entry to the Exit Table 113 and possibly the Exit Cache 151. This optimization potentially saves power and Exit Table/Exit Cache query cycles.

An untaken mispredict occurs when an operation predicted to exit does not, and instead control falls to the next sequential instruction. In this case, the Instruction Shifter 107A, following the path of the erroneous prediction, will have filled the decode pipeline with instructions from the expected path, which the mispredict exposes as unneeded. Much of the recovery from an untaken mispredict is common with a taken mispredict, discussed elsewhere. This discussion only summarizes the common behavior, while explaining in greater depth where the untaken mispredict differs.

Similar to the processing of taken mispredicts, the Mispredict Recovery Logic 159 can be configured to invalidate the state of Decode Stage 107, the Instruction Shifter 107A, the Prefetcher 175, the Fetcher 103 and the Decode Control Logic 155 when an untaken mispredict is detected. The contents of the Exit Cache 151 and the Instruction Buffer 105 can be left intact, although they may be overwritten when the processing of the new prediction chain by the Fetcher start. Furthermore, the Decode Control Logic 155 is supplied with the fall-through address and a "dummy" predictor entry, which has a null kind and has saturated cache line count and a saturated instruction count, which initializes the shifting operations of the Instruction Shifter 107A into a state as it was just prior to taking the erroneous transfer (except for having a "dummy" predictor rather than an exhausted predictor entry) and can resume isolating instructions at that point. The fall-through address and the "dummy" predictor entry are also passed to the Fetcher 103 which controls the Fetcher 103 to resume fetching cache lines at the fall-through address into the Instruction Buffer 105.

Whereas in a taken mispredict the prediction chain is restarted using the actual target address as a key, in an untaken mispredict the chain is restarted with the alternate key for the key that led to the mispredict. The alternate key is a regular key (i.e. the address of the entry point of an EBB) arithmetically modified in a consistent way that cannot cause an alternate key to collide with a valid regular key. Methods for doing the modification are discussed elsewhere. To determine the alternate key, the Mispredict Recovery Logic 159 can employ the regular key of the predictor entry that failed. Failure is detected at issue and execute time, when the operation that was expected to transfer did not do so. Thus, the Mispredict Recovery Logic 159 cannot use the then-current key because it is out of date with respect to the actually failing operation. Instead, the Instruction Shifter 107A can be configured to annotate each instruction it produces with information that says "if this instruction causes an unexpected untaken mispredict, then here is its alternate key." This annotation remains attached to the instruction and its operations as it works its way through the Decode Stage 107 to issue and execution, and is available to the operation that executes the unexpected untaken mispredict, which triggers an untaken mispredict and the processing as described herein.

In the case of the untaken mispredict, the Mispredict Recovery Logic 159 can be configured to use the alternate key for the EBB fragment to restart the prediction chain, and eventually a new stream of predictor entries from the Exit Table 113 or Exit Cache 151 will start to arrive in the Prediction Queue 153. In doing so, the Mispredict Recovery Logic 159 supplies the alternate key (the fall-through address of the untaken mispredicted operation) to the Exit Cache 151 to find a prediction for the new EBB fragment. This stops the chain currently being followed by the Exit Cache 151 (and possibly by the Prefetcher 175, Prediction Queue 153, Fetcher 103 and the Decode Control Logic 155 if such predictor entries were active). If the Exit Cache 151 has no matching predictor entries for the alternate key, then the Exit Table 113 will be queried with the alternate key. If no prediction is found in either place, then the Decode Control Logic 155 will control the Instruction Shifter 107A to shift indefinitely until the next mispredict. Note that the Decode Control Logic 155 does not count down the counts for the "dummy" predictor entry similar to a regular predictor entry. Instead, the count values remain saturated regardless of the number of instructions shifted. Consequently shifting after the untaken mispredict can shift more cache lines or instructions than are representable in a predictor entry. This is the same behavior as for regular predictions that overflow the representation of counts in a predictor entry.

As with taken mispredicts, the first predictor entry corresponding to the alternate chain to arrive in the Prediction Queue 153 replaces the "dummy" predictor entry. The processing of the Decode Control Logic 155 may have already overrun the first predictor entry, or even triggered a second mispredict. Both are handled in the same way as for taken mispredicts.

Eventually execution from the fall-through address will end with a successful transfer operation out of the current EBB, and a new predictor entry can be constructed and passed with both the regular and alternate keys to the Exit Table 113. The Exit Table 113 can be queried with the regular key to locate the matching predictor entry. Normally, it is not possible for the matching predictor entry to be vacant (check bits fail) in this case but if that should happen then it is replaced by the new predictor entry. Otherwise, the quality information of the matching predictor entry is downgraded. If the downgrade causes the quality information of the predictor entry to drop below the predefined threshold, then the regular predictor entry is replaced by the new predictor entry that follows the fall-through path. If the downgrade does not drop the regular prediction below the predefined threshold, then the Exit Table 113 can be queried with the alternate key. If the alternate prediction had in fact correctly predicted the fall-through path of the untaken mispredict, then the quality information of the predictor entry for the alternate key can be upgraded. Otherwise, the quality information of the predictor entry for the alternate key can be downgraded, and if below threshold it can be replaced by the new predictor entry. Thus quality information can be changed for both the regular and alternate predictions, but only at most one of the regular and alternate predictions will be replaced. The update may be optimized as for taken mispredicts if the update records carry the quality information with them.

Bulk Load of Prediction Entries

The predictor entries as maintained in the Exit Table 113 and Exit Cache 151 are based on experience learned as actual program behavior is compared with predicted behavior. The CPU 102 an also employ a hardware-based mechanism that provides bulk loading of predictor entries into the Exit Table 113 (and for filling the Exit Cache 151 with predictor entries) in order to improve prediction performance when processing cold code that the CPU has yet to process.

Figure 11:
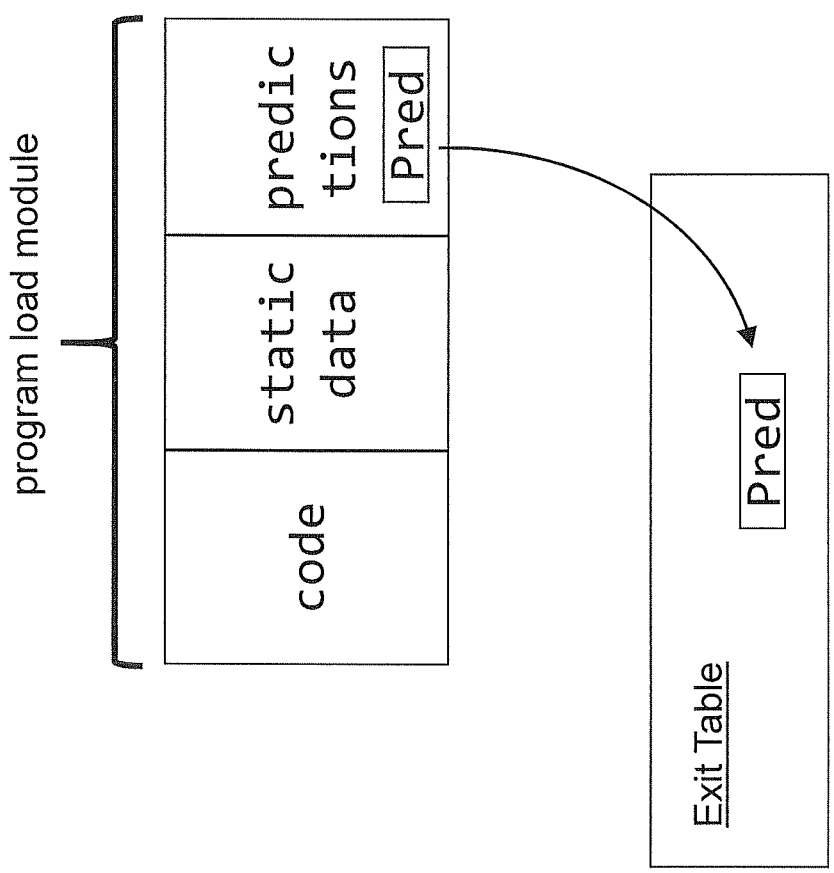
FIG. 11 is a schematic diagram of a program load module that supports the bulk load of predictors in accordance with the present disclosure.

In this case, the tool chain that produces executable code for execution on the CPU 102 can be configured to identify every EBB and control transfer operation in the executable code of a program. Specifically, the tool chain can employ heuristics, profiling, or other means to construct a prediction set for each given function in the executable code of the program. The prediction set provides predictor entries that constitute chains for all expected paths through the given function. The predication entries pertaining to a given function can be sorted based on the closeness (in virtual address space) of the predictor entries in an expected prediction chain starting at the entry address of the given function. These prediction sets can be stored as part of a load module (or program image) as shown in FIG. 11 (or as part of a file that is associated with the load module file) that is processed by a program loader that loads the load module (or parts of the load module) into the memory hierarchy of the CPU for execution by the CPU. The prediction sets can be arranged as part of the program load module (or possibly as part of a file that is associated with the load module file) such that is easy to locate the prediction set for a function given the entry address of the function. The operating system saves the memory address of the prediction sets of the load module when it maps the load module into the address space as part of loading a new program. This prediction structure address is available to a hardware-based prediction bulk loader (or prediction bulk loader)

Whenever the executing program has a taken mispredict on a call operation to a function and both the Exit Cache 151 and the Exit Table 113 have no prediction for the key that is the entry address of that function (i.e., a check bits failure), the missing key can be passed to the prediction bulk loader. The prediction bulk loader reads the prediction set for the called function from the memory hierarchy and walks the loaded predictor entries and enters them into the Exit Table 113 (and possibly adds one or more of such entries into the Exit Cache 151). The walking order corresponds to the sort order used by the tool chain when it created the prediction set, so the first predictor entries entered into the Exit Table 113 (and possibly added into the Exit Cache 151) will be those that are, in a prediction chain sense, closest to the entry point of the function and so are the ones most likely to be needed early as the function is executed.

The bulk loaded predictor entries can be of mixed quality. Predictor entries for unconditional control transfer operations will of course be predicted perfectly, but others may be little better than random. However the average will be significantly better than no cold code predictions at all, and will improve with execution experience. Bulk loaded predictor entries can be loaded through the normal data hierarchy, and so the predictor entries will be cached like other data from memory. Consequently the very first time that a function is called its prediction loading will suffer full memory latency while being loaded. This is not likely to be a source of delay because the corresponding code must also be loaded from the load module in memory. However, the predictor set for the function is typically smaller than code, so while both the predictor entries and code load slowly, the loading of the predictor entries for the function will complete first and can start prefetching down the initial chain of predictor entries for the function. This prefetching is concurrent with actual fetch and execution and will gain because the prefetch can have many requests in flight while fetch is largely a sequential process.

The CPU can perform context switching, which is a process of storing and restoring the state (context) of a process or thread so that execution can be resumed from the same point at a later time. Context switching enables multiple processes to share a single CPU and is an essential feature of a multitasking operating system. A context switch can involve clearing the Exit Table 113 (and possibly the Exit Cache 151) and configuring the bulk prediction loader to reload the Exit Table 113 (and possibly the Exit Cache 151) with the predictor entries for the resumed process. The prediction entries and the code of any called function of the resumed process will likely still be in the cache hierarchy so the prediction bulk loader may not need to reload such predictor entries from main memory. The bulk loading of predictor entries into the memory hierarchy will bring the predictions to the Exit Table 113 (and possibly the Exit Cache 151) without requiring a lot of warming mispredicts. The hoisting operations of the Prefetcher 175 can bring needed cache lines into the top level cache for rapid fetch.

Configurations with bulk loading of prediction entries may also be configured to write back predictor entries into the memory hierarchy as well as into the program load module (or associated file) for predictor entries that were updated in the Exit Table 113 (and possibly the Exit Cache 151) based on actual program experience. The written-back updates of the predictor entries can be stored in cache, giving better quality bulk-load predictions when the Exit Table is next cleared and then re-loaded due to a context switch. The program load module (or the associated file) can be configured as writable and the updated predictor entries can be written back to the program load module (or associated file) for persistent storage such that the next time the program is run the bulk load predictions will reflect the experience with the first and later executions. In effect, the first and subsequent runs of the program acts like a profiler to improve the prediction quality. If the program load module (or associated file) is not configured as writable, then the updated predictor entries cannot be saved into the program load module (or associated file). However, they still can be written back to cache. Such updated predictor entries can possibly be specially marked as cache-resident only values and not written on to main memory to avoid an operation system diagnostic.

Deferred Branch Operations

The instruction set architecture of the CPU 102 can support deferred control type operations, such as deferred branch operations. These are branch-type control transfer operations that have a machine cycle count argument in addition to their other arguments. The branch target address and predicate are evaluated when the operation is issued, but the control transfer is not actually completed (retired) as taken (if permitted by the predicate) based on the machine cycle count argument. When the transfer is completed as taken, the target address key of the deferred branch is forwarded to the Exit Cache 151 where it is checked to see if a matching prediction entry is found. If found, the logic assumes that the predictor entry for the deferred branch is already part of a predicted chain and no further action is taken. If not found in the Exit Cache 151, and the Exit Cache 151 is not currently working on a prediction chain, then the key is used to start a new chain. The new chain is stored in the Exit Cache 151 and allows the Prefetcher 175 to get a head start on predictions and instruction cache lines that will be of use in the future, although the sequence of execution that will lead to those cache lines is unknown when the notice is received.

The CPU can occasionally have machine cycles in which it has nothing to do but wait for an already issued operation to complete and retire. Such wait machine cycles can be indicated in the code, typically by a no-op (no operation) instruction, which frequently has special encoding to economize on code space. Thus, it is possible to have an empty EBB. In the absence of conditional deferred branch operations, a compiler can possibly optimize out any empty EBBs by replacing the control transfer into the empty EBB with one to wherever the empty EBB transfers out to. However, in the presence of conditional deferred branch operations, it is not possible in the general case to remove empty EBBs without test code replication, although a compiler can remove them in limited cases.

The transfer into an empty EBB can be predicted normally. The prediction for the transfer out must supply the target address, which will necessarily be from a deferred branch operation. The kind of the corresponding predictor entry can be a branch-type (corresponding to the deferred branch operation), and the untaken call count must be zero (the EBB contains no code and hence no calls). The cache line count and instruction count are zero. Such an empty predictor entry is handled by the Prediction Logic 111 like any other up to the Decode Control Logic 155. Specifically, the Decode Control Logic 155 controls the Decode Stage 107 to annotate the shifted instructions with their address so that executing transfers can check whether a taken or untaken transfer was predicted correctly. The hardware execution of a taken transfer (including a deferred transfer arising from a previously executed transfer operation) determines the target address and compares it to the instruction address of the next instruction to issue. The two must match or a mispredict is indicated. In the absence of a taken transfer, the next instruction to issue must be the fall-through instruction, which may be indicated in the address annotation or by a flag attached to the instruction by the Instruction Shifter, or again a mispredict is indicated. The transfer operation execution operates on an instruction with an annotated address to perform the mispredict check, but the predictor entry for an empty EBB nominally requests that no instructions be shifted and the Instruction Shifter be advanced to the following predictor entry in the chain. An instruction shifted from that following predictor entry would be annotated with the address of the following EBB, not the (nominal) address of the empty EBB. When the transfer into the empty EBB is executed, it will find that the next instruction to issue is not from the target address but is from the target of the target, and will signal a mispredict. Thus normal shifting from an empty EBB would signal a mispredict every time the empty EBB is entered. Hence the Instruction Shifter must isolate an empty instruction when it receives an empty EBB, and annotate it with the EBB address. This empty instruction passes through Decode Stage unchanged until it reaches the issue point. When the transfer into the empty EBB executes it finds the empty instruction next to issue, and checks that address normally, which succeeds. That check removes the empty instruction from its place in the decode pipeline, letting following instructions advance toward issue. The next following instruction will be from the EBB that was the target of the empty EBB, and will be annotated with that target address. By definition an empty EBB can only occur when there is a non-zero lag (no-op) count. Consequently there will be at least one cycle for the empty instruction to be removed and the following instruction moved to issue before the deferred branch operation that exits the empty EBB executes. When the exit branch executes, the target address is checked normally against the address of the next instruction to issue. These addresses will match.

Adaptation for Split-Stream Encoding

Figure 12:
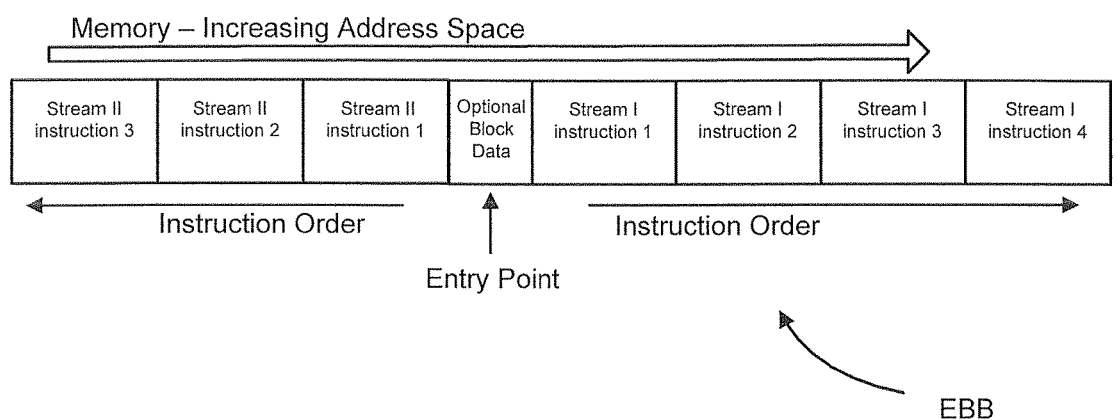
FIG. 12 is a schematic diagram of an exemplary EBB employing two split-instruction streams according to the present disclosure.

Each EBB can possibly include two distinct instruction streams that are labeled as "Stream I" and "Stream II" in FIG. 12. Stream I includes a number of instructions (such as four instructions as shown) with an instruction order that logically extends in a direction of increasing memory address space relative to the entry address of the EBB. Stream II includes a number of instructions (such as three instructions as shown) with an instruction order that logically extends in a direction of decreasing memory address space relative to the entry address of the EBB. The control transfer operation(s) of the EBB, if any, can be constrained to be part of the stream I instructions of the EBB or the stream II instructions of the EBB. In this case, the CPU can include two Decode Stages that are configured to independently decode the stream I instructions and the stream II instructions of the EBBs of a program. Furthermore, the CPU can include two top-level (L1) instruction caches and corresponding Instruction Buffers, one for each Decode Stage. Specifics of this configuration are described in detail in U.S. patent application Ser. No. 14/290,108, filed on May 29, 2014, herein incorporated by reference in its entirety. In this configuration, the CPU includes one Exit Table and Exit Cache that is configured to generate a chain of predictor entries for the predicted sequence of EBB fragments of a program. However, each predictor entry in the chain of predictor entries read from the Exit Cache is split into two different entries, one entry for supply to a first Prediction Queue that feeds Decode Control Logic for the Instruction Shifter/Decode Stage for stream I instructions of the predicted sequence of EBB fragments of the program and the other entry for supply to the second Prediction Queue that feeds Decode Control Logic for the Instruction Shifter/Decode Stage for the stream II instructions of the predicted sequence of EBB fragments of the program. The address field, transfer kind field, untaken call and iteration count fields of the two entries are identical but the cache line count and instruction count fields for the two entries can differ such that they represent the extent of the corresponding stream I instructions or stream II instructions in the predicted sequence of EBB fragments. Consequently a predictor entry stored in the Exit Table and Exit Cache contains only a single address field, untaken call count, iteration count, and transfer kind, but contains two pairs of cache line counts and instruction counts, one for each of the stream I instructions and stream II instructions of the corresponding EBB fragment. Eventually, when the predictor entry is read from the Exit Cache and split into two parts, the cache line and instruction count pair for the other stream is removed from the corresponding entry. This format can be referred to as a half-prediction or half-pred.

Note that Prefetcher, Fetcher, Decode Control Logic and Instruction Shifter are all duplicated, one for each of the two instruction streams I and II, but the processing of the two sides are similar to that described herein. Also note that Decode Stages of the stream I and stream II instructions of the predicted sequence of EBB fragments can be configured to advance in lock step in terms of machine cycles (ignoring NOOP instructions in either stream). Furthermore, the instruction sizes of the stream I and stream II instructions can vary with respect to one another such that the Decode Stages of the stream I and stream II instructions do not advance in lock step in terms of bytes.

Furthermore, the Prefetcher and Fetcher for the two instruction streams can be configured to issue prefetch requests that distinguish the cache lines that are to go to the corresponding Decode Stage of the two streams and issue the corresponding request in such a way that the hoisted cache lines are staged in the appropriate top-level (L1) instruction cache for the corresponding stream if the hoist would bring them to that level. Note that one Fetcher fetches additional lines toward increasing memory addresses while the other fetches additional lines toward decreasing memory addresses. In addition, the entry line of an EBB may need to be decoded by the Decode Stage for both streams. Rather than prefetch and/or fetch the cache line for the EBB entry point twice, the Prefetcher and/or the Fetcher can use the low bit of the target address to select one of the two top-level (L1) instruction caches to hoist into. This randomizes the location of the cache line for the entry point of the EBB which load balances the two top-level (L1) instruction caches. In this case, the Fetcher for each one of the two streams must be able to make requests to the two top-level (L1) instruction caches, and the resulting cache lines must have paths to both Instruction Buffers for the two streams.

The connection between Exit Cache and the two Prediction Queues can be organized such that the queues receive half-preds independently, or alternatively the Exit Cache may extract a full predictor entry only when both queues can accept a half-pred. The former arrangement permits somewhat better buffering in the Prediction Queues because one can run ahead of the other, while the latter arrangement reduces the number of access ports that the Exit Cache maintains.

VARIATIONS

While the target code address of most call, jump and branch operations known statically at compile time, some fraction of transfers have their target address computed at run time, for example when calling through function pointer variables. However, for the purposes of prediction how the target address is determined at execution is irrelevant: the executed transfer has an address, and the predictor was either right or wrong about what that address was. That is, dynamic target addresses can be predicted in exactly the same way as static addresses are.

It is possible for the information and associated processing of the predictor update records stored in the Update Queue can be merged into the predictor entries (or half-preds) stored in the Prediction Queue(s) of the CPU. This would allow the separate data structure of the Update Queue to be omitted while the update records remain logically distinct.

Furthermore, there are many other techniques in use for branch prediction that are directly adaptable to the generation and processing of exit predictor entries as described herein. For example, it is possible for the Exit Table to be configured to store multiple predictor entries for each EBB or EBB fragment. The search key of the Exit Table can be modified to contain history information about the flow of control that led up to the keyed EBB or EBB fragment, and selects from among the stored predictor entries.

Furthermore, tables such as the Exit Table tend to be large and to consume significant chip area and power. A variation on the single hardware table is to treat the table as the top cache of a hierarchy of tables, possibly extending down to an underlying very large table in memory. In such a hierarchy, if no predictor entry is found corresponding to a particular search key (i.e. the check bits did not match) then search is continued in the next table down, in a manner analogous to the caches in the memory hierarchy. If an entry is not found at the top level table but is found lower down then the predictor entry can be hoisted up the table hierarchy so that it will be found more easily the next time that the EBB or EBB fragment is entered. The hoisted predictor entry will necessarily replace some other predictor entry, which can be lowered down the hierarchy in case it might be needed in the future. Standard techniques for improving performance of a cache are applicable, such as victim buffers.

Furthermore, the Exit Table predictor constructs and associated processing can be adapted for instruction block formats and organizations for sequences (or streams) of program code that are different from the EBBs and associated EBB fragments as described herein.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the micro-architecture and memory organization of the CPU 101 as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. An apparatus for predicting control flow through sequences of instructions executed by a computer processor, wherein the sequences of instructions are stored in memory and organized as one or more instruction blocks each having an entry point and at least one exit point offset from the entry point, wherein each instruction block is partitioned into one or more fragments, where each fragment begins with either the entry point of the instruction block or a return point from a call operation, and ends with either a call operation or a conditional or unconditional exit from the instruction block, the apparatus comprising:

a table storing a plurality of entries each associated with an instruction block or fragment thereof, wherein at least one entry corresponding to a given instruction block or fragment thereof includes a predictor corresponding to a predicted execution path that exits the given instruction block or fragment thereof, wherein the table is queried in order to generate a chain of predictors corresponding to a sequence of instruction blocks or fragments thereof that is predicted to be executed by the computer processor.

2. The apparatus according to claim 1, wherein:
the at least one entry corresponding to the given instruction block or fragment thereof includes an address field that points to a target instruction block or fragment thereof.

3. The apparatus according to claim 2, wherein:
said address field comprises an offset address relative to a base address.

4. The apparatus according to claim 2, wherein:
the at least one entry corresponding to the given instruction block or fragment thereof further includes information that represents the extent of the instructions of the given instruction block or fragment thereof predicted to be executed by the computer processor as stored in memory.

5. The apparatus according to claim 4, wherein:
said information that represents the extent of the instructions of the given instruction block or fragment thereof predicted to be executed by the computer processor as stored in memory includes a cache line count value and an instruction count value, wherein the cache line count value that represents the number of cache lines of the given instruction block or fragment thereof as stored in memory, and wherein the instruction count value represents the number of instructions in the last cache line of the given instruction block or fragment thereof as stored in memory.

6. The apparatus according to claim 2, wherein:
the at least one entry corresponding to the given instruction block or fragment thereof further includes information that is used to control prefetching of cache lines of the given instruction block or fragment thereof into cache that is logically part of the memory that stores the sequence of instructions, or hoist such cache lines within the cache.

7. The apparatus according to claim 2, wherein:
the at least one entry corresponding to the given instruction block or fragment thereof further includes information that is used to control fetching of cache lines of the given instruction block or fragment thereof into an instruction buffer.

8. The apparatus according to claim 2, wherein:
the at least one entry corresponding to the given instruction block or fragment thereof further includes information that is used to control decoding of the instructions of the given instruction block or fragment thereof.

9. The apparatus according to claim 2, wherein:
the at least one entry corresponding to the given instruction block or fragment thereof further includes information that is used to obtain cache lines of the given instruction block or fragment thereof from an instruction buffer for decode processing.

10. The apparatus according to claim 2, wherein:
the at least one entry corresponding to the given instruction block or fragment thereof further includes information that is used to control isolation of instructions from the cache lines of the given instruction block or fragment thereof for instruction decode processing.

11. The apparatus according to claim 2, wherein:
the at least one entry corresponding to the given instruction block or fragment thereof further includes metadata corresponding to the predictor, wherein the metadata is selected from the group consisting of:

an indicator of the expected kind of control transfer operation to the target instruction block or fragment thereof,
a count of the number of untaken conditional call operations contained by the corresponding instruction block or fragment thereof,
a number of key check bits for detecting hashing collisions,
information about the quality of the prediction defined by the predictor, and
loop information for the corresponding instruction block or fragment thereof.

12. The apparatus according to claim 1, further comprising:
an exit cache that stores predictors output from the table.

13. The apparatus according to claim 1, further comprising:
a prefetcher that is configured to process predictors output from the table in order to prefetch cache lines of instruction blocks or fragments thereof that correspond to said predictors into cache that is logically part of the memory that stores the sequence of instructions, or hoist such cache lines within the cache.

14. The apparatus according to claim 12, further comprising:
a queue that stores a set of predictors output from the exit cache.

15. The apparatus according to claim 14, further comprising:
a fetcher that is configured to process the set of predictors stored in the queue in order to fetch cache lines of instruction blocks or fragments thereof that correspond to said predictors into an instruction buffer.

16. The apparatus according to claim 14, further comprising:
decode control logic that is configured to process the set of predictors stored in the queue in order to control decoding of instructions of instruction blocks or fragments thereof that correspond to said predictors.

17. The apparatus according to claim 16, wherein:
the computer processor includes an instruction shifter that obtains cache lines from an instruction buffer and isolates instructions from such cache lines; and
the decode control logic is configured to process a given predictor at the head of the queue in order to control operation of the instruction shifter to obtain at least one cache line that contains one or more instructions of the instruction block or fragment thereof that corresponds to the given predictor.

18. The apparatus according to claim 17, wherein:
the decode control logic is configured to process the given predictor in order to control operation of the instruction shifter to isolate each instruction of the instruction block or fragment thereof that corresponds to the given predictor.

19. The apparatus according to claim 1, further comprising:
mispredict logic that processes information related to execution behavior of the computer processor in order to detect a mispredict in the chain of predictors and start a new chain of predictors that initially follows the actual execution path of such execution behavior.

20. The apparatus according to claim 19, wherein:
said mispredict logic updates the predictor entries stored in the table based on the execution behavior of the computer processor.

21. The apparatus according to claim 1, further comprising:
a mechanism that stores predictor entries for a program and is configured to load such predictor entries into the table during execution of the program.

22. The apparatus according to claim 21, wherein:
the mechanism is configured to load into the table predictor entries corresponding to a particular function in the event that computer processor experiences a taken mispredict with respect to a call operation to the particular function and the table does not include any predictor entries for the particular function.

23. The apparatus according to claim 21, wherein:
the mechanism is further configured to update the predictor entries stored for the program in persistent storage for access the next time that the program is run.

24. The apparatus according to claim 1, wherein:
at least one instruction block includes one or more call operations and associated return operations.

25. The apparatus according to claim 1, wherein:
successive fragments of a given instruction block are associated with keys that are arithmetically derivable from the key of the previous fragment.

26. The apparatus according to claim 1, wherein:
at least one entry of the table stores an alternate key predictor corresponding to an execution path that does not exit a given instruction block or fragment thereof and corresponds to a misprediction of one other entry stored in the table, wherein said alternate key predictor is associated with an alternate key that is arithmetically derivable from a key associated with said one other entry.

27. The apparatus according to claim 1, wherein:
the at least one exit point of each instruction block is defined by a control flow operation selected from a call operation, a conditional branch operation and an unconditional branch operation.

* * * * *